US009248732B2

(12) United States Patent
Honda

(10) Patent No.: US 9,248,732 B2
(45) Date of Patent: Feb. 2, 2016

(54) POWER PLANT

(71) Applicant: HONDA MOTOR CO., LTD., Tokyo (JP)

(72) Inventor: Kenji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/353,537

(22) PCT Filed: Oct. 29, 2012

(86) PCT No.: PCT/JP2012/077884
§ 371 (c)(1),
(2) Date: Apr. 23, 2014

(87) PCT Pub. No.: WO2013/065636
PCT Pub. Date: May 10, 2013

(65) Prior Publication Data
US 2014/0256490 A1  Sep. 11, 2014

(30) Foreign Application Priority Data

Nov. 2, 2011 (JP) ................................. 2011-241371
Mar. 28, 2012 (JP) ................................. 2012-074211

(51) Int. Cl.
*B60K 6/547* (2007.10)
*F16H 48/36* (2012.01)
(Continued)

(52) U.S. Cl.
CPC . *B60K 6/547* (2013.01); *B60K 6/52* (2013.01); *F16H 48/36* (2013.01); *B60K 1/02* (2013.01); *F16H 2048/364* (2013.01); *Y02T 10/6265* (2013.01); *Y10S 903/902* (2013.01)

(58) Field of Classification Search
CPC ............ B60K 1/02; B60K 6/20; B60K 6/365; B60K 6/445; B60K 6/547; B60K 2006/266; B60K 2006/4825; F16H 2001/2872; F16H 2048/106; F16H 2048/364
See application file for complete search history.

(56) References Cited

U.S. PATENT DOCUMENTS

2011/0281684 A1* 11/2011 Ushiroda et al. .............. 475/331

FOREIGN PATENT DOCUMENTS

DE  10 2006 030 214 A1   1/2007
EP      2 386 782 A2    11/2011
(Continued)

OTHER PUBLICATIONS

International Search Report dated Jan. 22, 2013, issued in corresponding application No. PCT/JP2012/077884.
(Continued)

*Primary Examiner* — Huan Le
(74) *Attorney, Agent, or Firm* — Westerman, Hattori, Daniels & Adrian, LLP

(57) ABSTRACT

A power plant capable of suppressing loss, and attaining downsizing and enhancement of mountability of the power plant. In the power plant T, the rotational speeds of third to first sun gears S3 to S1 and a carrier member 111 are in a collinear relationship with each other, and are sequentially aligned in the mentioned order in a collinear chart indicating the relationship between the rotational speeds. Further, the third sun gear S3 and the carrier member 111 are connected to first and second torque generators 113 and 114 capable of generating positive torque and negative torque, respectively, and the second and first sun gears S2 and S1 are connected to one and the other of two rotating shafts, respectively.

15 Claims, 22 Drawing Sheets

(51) Int. Cl.
  *B60K 6/52* (2007.10)
  *B60K 1/02* (2006.01)

(56) References Cited

FOREIGN PATENT DOCUMENTS

| EP | 2386782 | A2 | 11/2011 |
|---|---|---|---|
| JP | 6-98498 | A | 4/1994 |
| JP | 3104157 | B2 | 10/2000 |
| JP | 2010-188810 | A | 9/2010 |
| JP | 2010-190284 | A | 9/2010 |
| JP | 2011-237019 | A | 11/2011 |
| WO | 2005/110790 | A2 | 11/2005 |

OTHER PUBLICATIONS

Extended European Search Report dated Jun. 16, 2015, issued in corresponding European Patent Application No. 12846398.1 (9 pages).

\* cited by examiner

F I G. 8
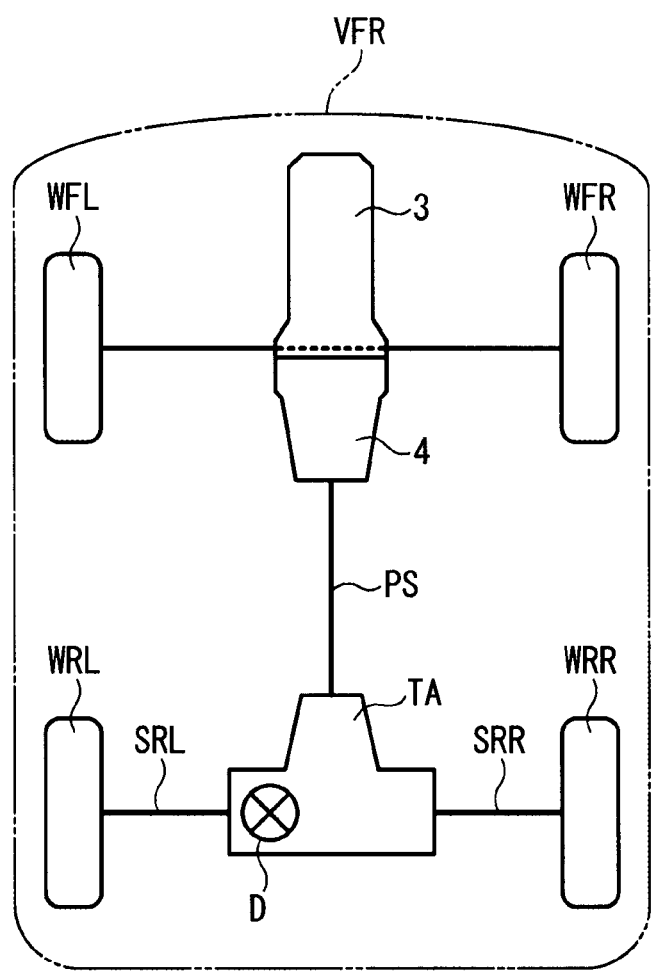

POWER PLANT

FIELD OF THE INVENTION

The present invention relates to a power plant that drives two rotating shafts configured to be differentially rotatable with each other in order to move a moving apparatus.

BACKGROUND ART

Conventionally, as a power plant of this kind, one disclosed in PTL 1 is known. This conventional power plant is applied to a four-wheel vehicle, and includes an internal combustion engine as a motive power source, a differential gear for distributing torque of the engine to left and right output shafts, a rotatable carrier member, a triple pinion gear rotatably supported by the carrier member, and hydraulic speed-increasing and speed-reducing clutches. The left and right output shafts are connected to left and right drive wheels, respectively. Further, the triple pinion gear comprises a first pinion gear, a second pinion gear, and a third pinion gear, which have pitch circles different from each other, and these first to three pinion gears are integrally formed with each other. The first pinion gear is in mesh with a first sun gear integrally formed with the right output shaft, and the second pinion gear is in mesh with a second sun gear integrally formed with the left output shaft. Further, the third pinion gear is in mesh with a rotatable third sun gear. Furthermore, the third sun gear and an immovable casing are connected to and disconnected from each other by the speed-increasing clutch, and the carrier member and the casing are connected to and disconnected from each other by the speed-reducing clutch.

In the conventional power plant constructed as above, during straight forward traveling thereof, the third sun gear and the casing are disconnected from each other by disengagement of the speed-increasing clutch, and the carrier member and the casing are disconnected from each other by disengagement of the speed-reducing clutch. Further, torque of the engine is distributed to the left and right output shafts via the differential gear. Accordingly, the carrier member, the third sun gear, and the speed-increasing and speed-reducing clutches idly rotate along with transmission of rotation from the engine. Further, during the left or right turning of the vehicle, by controlling the engagement forces of the speed-increasing and speed-reducing clutches, the distribution of torque to the left and right output shafts is controlled. Specifically, during the right turning of the vehicle, the third sun gear and the casing are disconnected from each other by disengagement of the speed-increasing clutch, and the carrier member and the casing are connected to each other by engaging the speed-reducing clutch, whereby the carrier member is decelerated. This causes part of torque of the right output shaft to be transmitted to the left output shaft via the first sun gear, the first pinion gear, the second pinion gear, and the second sun gear, so that torque distributed to the left output shaft is increased with respect to the right output shaft. In this case, by controlling the degree of the engagement of the speed-reducing clutch, the torque distributed to the left output shaft is controlled.

On the other hand, during the left turning of the vehicle, the carrier member and the casing are disconnected from each other by disengagement of the speed-reducing clutch, and the third sun gear and the casing are connected to each other by engagement of the speed-increasing clutch, whereby the carrier member is accelerated. This causes part of torque of the left output shaft to be transmitted to the right output shaft via the second sun gear, the second pinion gear, the first pinion gear, and the first sun gear, so that torque distributed to the right output shaft is increased with respect to the left output shaft. In this case, by controlling the degree of the engagement of the speed-increasing clutch, the torque distributed to the right output shaft is controlled.

CITATION LIST

[Patent Literature 1]
[PTL 1] Publication of Japanese Patent No. 3104157

SUMMARY OF INVENTION

Technical Problem

As described above, in the conventional power plant, the speed-increasing and speed-reducing clutches are used to control distribution of torque to the left and right output shafts, and these speed-increasing and speed-reducing clutches idly rotate as rotation from the engine is transmitted. Therefore, when wet friction clutches are used as the speed-increasing and speed-reducing clutches, large dragging losses are caused by shear resistance due to the viscosity of lubricating oil therefor.

Further, when a hydraulic pump which uses the engine as a motive power source is used for supplying oil pressure to the hydraulic speed-increasing and speed-reducing clutches, the hydraulic pump is always driven during operation of the engine irrespective of the distribution control of torque to the left and right output shafts, and hence torque of the engine is wastefully consumed. Furthermore, a spool valve, a solenoid, a strainer, and so forth are required for driving the speed-increasing and speed-reducing clutches, which causes an increase in the size of the power plant and degradation of mountability thereof.

The present invention has been made to provide a solution to the above-described problems, and an object thereof is to provide a power plant which is capable of suppressing loss and attaining size reduction and enhancement of mountability thereof.

Solution to Problem

To attain the above object, the first aspect of the present application is a power plant 1, 1A to 1E (power transmission system T) that, in order to move a moving apparatus (vehicle VFR, vehicle VAW in embodiments (the same applies hereinafter in this section)), drives two rotating shafts (left and right output shafts SRL and SRR, left and right output shafts SFL and SFR) configured to be differentially rotatable with each other, comprising a carrier member 13, 111 that is rotatable, a triple pinion gear 14, 112 that is formed by a first pinion gear P1, a second pinion gear P2, and a third pinion gear P3, which are integrally formed with each other, and is rotatably supported by the carrier member 13, 111, a first sun gear S1 that is rotatable and is in mesh with the first pinion gear P1, a second sun gear S2 that is rotatable and is in mesh with the second pinion gear P2, a third sun gear S3 that is rotatable and is in mesh with the third pinion gear P3, wherein the triple pinion gear 14, 112 and the first to third sun gears S1 to S3 are configured such that when the triple pinion gear 14, 112 is rotating in a state in which the carrier member 13, 111 is fixed, a rotational speed of the second sun gear S2 becomes higher than a rotational speed of the first sun gear S1, and a rotational speed of the third sun gear S3 becomes higher than the rotational speed of the second sun gear S2, the power plant further comprising a first torque generator (first rotating electric machine 11, first motor 113) that is capable of generating positive torque and negative torque, and a second torque generator (second rotating electric machine 12, second motor 114) that is capable of generating positive torque and negative torque, wherein the third sun gear S3 is connected to the first torque generator, the second sun gear S2 is connected to one (left output shaft SRL, SFL) of the two rotating shafts, the first sun gear S1 is connected to the other (right output shaft SRR, SFR) of the two rotating shafts, and the carrier member 13, 111 is connected to the second torque generator, and is connected to the third sun gear S3 and the carrier member 13, 111.

With this arrangement, the triple pinion gear is rotatably supported by the rotatable carrier member and the rotatable first to third sun gears are in mesh with the first to third pinion gears, which form the triple pinion gear and are integrally formed with each other, respectively. Further, the triple pinion gear and the first to third sun gears are configured such that when the triple pinion gear is rotating in the state in which the carrier member is fixed, the rotational speed of the second sun gear becomes higher than the rotational speed of the first sun gear, and the rotational speed of the third sun gear becomes higher than the rotational speed of the second sun gear. With this configuration, four rotary elements the rotational speeds of which are in a collinear relationship with each other is formed by the third to first sun gears and the carrier member. Here, the term "collinear relationship" refers to a relationship in which the rotational speeds of them are located on the same straight line in a collinear chart. Further, from the above-described relationship between the rotational speeds of the first to third sun gears, the third sun gear, the second sun gear, the first sun gear, and the carrier member are aligned in the mentioned order in this collinear chart.

Furthermore, the third sun gear is connected to the first torque generator, the second and first sun gears are connected to one of the two rotating shafts (hereinafter referred to as the "one rotating shaft"), and the other of the two rotating shafts (hereinafter referred to as the "other rotating shaft"), respectively, and the carrier member is connected to the second torque generator. From the above, it is possible to transmit the positive torque and the negative torque generated by the first and second torque generators (load torque) to the two rotating shafts via the third to first sun gears and the carrier member, to properly drive the rotating shafts. In this case, the rotational speeds of the third to first sun gears and the carrier member are in the collinear relationship with each other as described above, so that by controlling the positive torque and the negative torque generated by the first and second torque generators, it is possible to properly control torque distributed to the two rotating shafts. Note that the phrase "negative torque generated by the first and second torque generators" refers to torque which acts as load on the third sun gear and the carrier member connected to the first and second torque generators, respectively.

Further, differently from the conventional case described hereinabove, to control the torque distributed to the two rotating shafts, not the speed-increasing and speed-reducing clutches formed by wet friction clutches but the first and second torque generators are used, and no large dragging losses occur, and therefore loss can be suppressed. In addition to this, it is possible to dispense with a hydraulic pump for supplying oil pressure to the speed-increasing and speed-reducing clutches. Furthermore, it is also possible to dispense with a spool valve, a solenoid, a strainer, and so forth, for driving the two clutches, and it is possible to downsize the power plant and enhance the mountability thereof accordingly.

The second aspect of the present application is the power plant 1, 1A to 1E according to the above first aspect, further comprising a differential limiting mechanism 16, 41 for limiting differential rotation between the two rotating shafts by connecting and disconnecting between the third sun gear S3 and the carrier member 13.

With this arrangement, out of the four rotary elements consisting of the third to first sun gears and the carrier member, rotary elements positioned at opposite ends of the straight line in the collinear chart, that is, the third sun gear and the carrier member are connected to and disconnected from each other by the differential limiting mechanism. Since the rotational speeds of the third to first sun gears and the carrier member are in the collinear relationship with each other, the third to first sun gears and the carrier member are caused to rotate in unison with each other by the connection between the third sun gear and the carrier member by the differential limiting mechanism, and hence it is possible to limit differential rotation between the one rotating shaft having the second sun gear connected thereto and the other rotating shaft having the first sun gear connected thereto, thereby making it possible to enhance stability of the behavior of the moving apparatus. In this case, since it is only required to simply connect the differential limiting mechanism, it is possible to easily limit the differential rotation between the two rotating shafts, and obtain high responsiveness of the differential limiting mechanism.

Further, FIG. 23 is a collinear chart illustrating an example of a rotational speed relationship and a torque balance relationship between the various elements, obtained assuming that the third sun gear and the carrier member are connected by the differential limiting mechanism, in a case where the rotational speed of the other rotating shaft is higher than the rotational speed of the one rotating shaft. In FIG. 23, the distance from a horizontal line indicative of 0 to a white circle shown on each vertical line corresponds to the rotational speed of each of the rotary elements. The same applies to other collinear charts, referred to hereinafter. In FIG. 23, RC1 represents reaction force torque acting on the third sun gear from the differential limiting mechanism along with the connection of the differential limiting mechanism, and RLC1 and RRC1 represent reaction force torques acting on the one rotating shaft and the other rotating shaft, respectively, as the reaction force torque RC1 acts on the third sun gear. Further, RC2 represents reaction force torque acting on the carrier member from the differential limiting mechanism along with the connection of the differential limiting mechanism, and RLC2 and RRC2 represent reaction force torques acting on the one rotating shaft and the other rotating shaft, respectively, as the reaction force torque RC2 acts on the carrier member.

In this case, torque transmitted to the one rotating shaft along with the connection of the differential limiting mechanism is expressed by $RLC1+RLC2=RC1 \times (X+1)+RC2 \times Y$, and torque transmitted to the other rotating shaft along with the connection is expressed by $-\{RRC1+RRC2\}=-\{RC1 \times X+RC2 \times (Y+1)\}$. As described above, the torque transmitted to the one rotating shaft having a lower rotational speed increases, and braking torque acts on the other rotating shaft having a higher rotational speed, whereby the differential rotation between the two rotating shafts is reduced and limited. Further, as is apparent from the connection between the third sun gear and the carrier member, the reaction force torques RC1 and RC2, which act on the third sun gear and the carrier member from the differential limiting mechanism, respectively, are not only opposite in direction but also equal in magnitude to each other.

From the above, the sum total of the differential limiting torques, which act on the respective two rotating shafts by the connection of the differential limiting mechanism such that the differential rotation between the rotating shafts is limited (hereinafter referred to as "total differential limiting torque") is expressed by $RC1 \times (X+1) + RC1 \times Y + \{RC1 \times X + RC1 \times (Y+1)\} = 2 \times RC1 \times (X+Y+1)$ when RC1 is used as a representative of the reaction force torques RC1 and RC2.

Further, FIG. 24 is a collinear chart illustrating an example of a rotational speed relationship and a torque balance relationship between the various rotary elements, obtained assuming, differently from the above-described invention, that out of the above-described four rotary elements, the second sun gear connected to the one rotating shaft and the first sun gear connected to the other rotating shaft are connected by the differential limiting mechanism, in the case in which the rotational speed of the other rotating shaft is higher than the rotational speed of the one rotating shaft. In FIG. 24, RC1 and RC2 represent reaction force torques acting on the respective second and first sun gears from the differential limiting mechanism along with connection of the differential limiting mechanism.

In this case, torque transmitted to the one rotating shaft and torque transmitted to the other rotating shaft along with the connection of the differential limiting mechanism are represented by RC1 and −RC2, respectively. As described above, the torque transmitted to the one rotating shaft having a lower rotational speed increases, and braking torque acts on the other rotating shaft having a higher rotational speed, so that the differential rotation between the two rotating shafts is limited. Further, as is apparent from the connection between the first and second sun gears, the reaction force torques RC1 and RC2, which act on the second and first sun gears from the differential limiting mechanism, respectively, are not only opposite in direction but also equal in magnitude to each other.

From the above, total differential limiting torque acting by the connection of the differential limiting mechanism between the second and first sun gears is expressed by $RC1 + RC1 = 2 \times RC1$ when RC1 is used as a representative of the reaction force torques RC1 and RC2. On the other hand, as described hereinabove, the total differential limiting torque according to the present invention (FIG. 23) becomes larger than the case where the connection between the second and first sun gears is effected (FIG. 24), as is apparent from the expression of $2 \times RC1 \times (X+Y+1)$.

Further, FIG. 25 is a collinear chart illustrating an example of a rotational speed relationship and a torque balance relationship between the various elements, obtained assuming, differently from the above-described invention, that out of the four rotary elements, the third sun gear and the first sun gear are connected by the differential limiting mechanism, in the case where the rotational speed of the other rotating shaft is higher than the rotational speed of the one rotating shaft. In FIG. 25, RC1 represents reaction force torque acting on the third sun gear from the differential limiting mechanism along with the connection of the differential limiting mechanism, and RLC1 and RRC1 represent reaction force torques acting on the one rotating shaft and the other rotating shaft, respectively, as the reaction force torque RC1 acts on the third sun gear. Further, RC2 represents reaction force torque acting on the other rotating shaft via the first sun gear from the differential limiting mechanism along with the connection of the differential limiting mechanism, and RLC2 and RSC2 represent reaction force torques acting on the one rotating shaft and the third sun gear, respectively, as the reaction force torque RC2 acts on the first sun gear.

In this case, torque transmitted to the one rotating shaft along with the connection of the differential limiting mechanism is expressed by $RLC1 - RLC2 = RC1 \times (X+1) - RC2 \times (X+1)/X$, and torque transmitted to the other rotating shaft along with the connection is expressed by $-(RC2+RRC1) = -(RC2+RC1 \times X)$. As described above, the torque transmitted to the one rotating shaft having a lower rotational speed increases, and braking torque acts on the other rotating shaft having a higher rotational speed, so that the differential rotation between the two rotating shafts is limited. Further, as is apparent from the connection between the third sun gear and the first sun gear, the reaction force torques RC1 and RC2, which act on the third sun gear and the first sun gear from the differential limiting mechanism, respectively, are not only opposite in direction but also equal in magnitude to each other.

From the above, total differential limiting torque acting on the two rotating shafts by the connection of the differential limiting mechanism between the third and first sun gears is expressed by $RC1 \times (X+1) - RC1 \times (X+1)/X + (RC1 + RC1 \times X) = 2 \times RC1 \times \{X+1-(X+1)/(2 \times X)\}$ when RC1 is used as a representative of the reaction force torques RC1 and RC2. On the other hand, the total differential limiting torque according to the present invention (FIG. 23) becomes larger than the case where the third and first sun gears are connected by the differential limiting mechanism (FIG. 25), as is apparent from the expression of $2 \times RC1 \times (X+Y+1)$. The same applies to a case where two rotary elements according to a combination other than the above-described combination of two of the four rotary elements (the third to first sun gears and the carrier member) are connected by the differential limiting mechanism. Further, although FIGS. 23 to 25 are examples of the case in which the rotational speed of the other rotating shaft is higher than the rotational speed of the one rotating shaft, inversely to the above, also when the rotational speed of the one rotating shaft is higher than the rotational speed of the other rotating shaft, the total differential limiting torque according to the present invention becomes larger.

As described above, by connecting, the third sun gear and the carrier member of the four rotary elements, as rotary elements positioned at opposite ends of the straight line in the collinear chart, to each other, it is possible to obtain the largest total differential limiting torque. This makes it possible to reduce reaction force torque which is required of the differential limiting mechanism to limit the differential rotation between the two rotating shafts, and hence it is possible to downsize the differential limiting mechanism, thereby making it possible to further downsize the power plant and enhance the mountability thereof.

Further, according to the present invention, to form four rotary elements the rotational speeds of which are in the collinear relationship with each other, a gear unit comprising the triple pinion gear, the first to third sun gears, and the carrier member is used. Therefore, compared with e.g. a case where a combination of two planetary gear units of a single pinion type is used to form the four rotary elements, it is possible to reduce the number of component parts, and reduce the radial size of the gear unit since the gear unit includes no ring gear.

The third aspect of the present application is the power plant 1A, 1D according to the above second aspect, further comprising a first power transmission mechanism (gear 51, gear 52) that is provided in a power transmission path between the third sun gear S3 and the differential limiting mechanism 41, for transmitting reaction force torque of the differential limiting mechanism 41, generated by connection between the third sun gear S3 and the carrier member 14 by the differential limiting mechanism 41, to the third sun gear S3, in an increased state, and a second power transmission mechanism (gear 53, gear 54) that is provided in a power transmission path between the carrier member 13 and the differential limiting mechanism 41, for transmitting reaction force torque of the differential limiting mechanism 41, generated by connection between the third sun gear S3 and the carrier member 13 by the differential limiting mechanism 41, to the carrier member 13, in an increased state.

As is apparent from the description given of the second aspect of the present application with reference to FIG. 23, as the reaction force torque of the differential limiting mechanism, generated by the connection between the third sun gear and the carrier member by the differential limiting mechanism is larger, the above-described total differential limiting torque (torque that limits the differential rotation between the two rotating shafts) becomes larger. With the above-described arrangement, the reaction force torque of the differential limiting mechanism is transmitted to the third sun gear by the first power transmission mechanism in an increased state, and is transmitted to the carrier member by the second power transmission mechanism in an increased state. Therefore, the total differential limiting torque can be increased, and hence it is possible to further reduce the reaction force torque which is required of the differential limiting mechanism to limit the differential rotation between the two rotating shafts, whereby it is possible to further downsize the differential limiting mechanism. In this case, for example, when relatively small-sized mechanisms, such as gears, are employed as the first and second power transmission mechanisms, a space necessary for arranging both the mechanisms is smaller than a space reduced by downsizing the above-described differential limiting mechanism. Therefore, by downsizing the differential limiting mechanism, it is possible to further downsize the power plant and enhance the mountability thereof.

The fourth aspect of the present application is the power plant 1C to 1E (power transmission system T) according to any one of the above first to third aspects, further comprising a differential gear D that includes a first rotating body (sun gear SD), a second rotating body (carrier CD), and a third rotating body (ring gear RRD), which are differentially rotatable with each other, and a torque generator (engine 3) that is capable of generating positive torque, and is provided separately from the first and second torque generators, and wherein the first rotating body is connected to the second sun gear S2, the second rotating body is provided in a power transmission path between the first sun gear S1 and the other of the two rotating shafts, and the third rotating body is connected to the torque generator.

With this arrangement, the first to third rotating bodies of the differential gear are configured to be differentially rotatable with each other. Further, the first rotating body is connected to the above-described second sun gear, and is connected to the one rotating shaft via the second sun gear. The second rotating body is provided in the power transmission path between the first sun gear and the other rotating shaft, and the third rotating body is connected to the torque generator. Further, this torque generator is provided separately from the first and second torque generators. From the above, in addition to the positive torque from the first and second torque generators, the positive torque from the torque generator is transmitted to the two rotating shafts, and hence it is possible to reduce torque required of the first and second torque generators, thereby making it possible to downsize the torque generators.

The fifth aspect of the present application is the power plant 1, 1A to 1E (power transmission system T) according to any one of the above first to fourth aspects, wherein the first and second torque generators are rotating electric machines.

With this arrangement, since general rotating electric machines are used as the first and second torque generators, it is possible to construct the power plant easily and more inexpensively without using a special device. Further, in the case where distribution of torque to the two rotating shafts is controlled as described above, when negative torque is generated by the first and second torque generators, it is possible to convert motive power to electric power using the rotating electric machines. Therefore, for example, when the power plant is applied to a vehicle, by supplying the electric power obtained by the conversion to a vehicle accessory, it is possible to reduce the operating load and operating frequency of a generator for charging the power source of the accessory.

To attain the above object, the sixth aspect of the present application is a power plant 1, 1A to 1E that, in order to move a moving apparatus (vehicle VFR, vehicle VAW in embodiments (the same applies hereinafter in this section)), drives two rotating shafts (left and right output shafts SRL and SRR, left and right output shafts SFL and SFR) configured to be differentially rotatable with each other comprising a gear unit GS that includes a first element (third sun gear S3), a second element (second sun gear S2), a third element (first sun gear S1), and a fourth element (carrier member 13), between which motive power can be transmitted, and is configured such that rotational speeds of the first to fourth elements are in a predetermined collinear relationship in which the rotational speeds are located on the same straight line in a collinear chart, and when the second to fourth elements are caused to rotate in a state of the first element being fixed, the second to fourth elements rotate in the same direction, and the rotational speed of the fourth element becomes higher than the rotational speeds of the second and third elements, a first torque generator (first rotating electric machine 11) that is capable of generating positive torque and negative torque, and a second torque generator (second rotating electric machine 12) that is capable of generating positive torque and negative torque, wherein the first element is connected to the first torque generator, the second element is connected to one (left output shaft SRL, SFL) of the two rotating shafts, the third element is connected to the other (right output shaft SRR, SFR) of the two rotating shafts, and the fourth element is connected to the second torque generator, the power plant further comprising a differential limiting mechanism 16, 41 that is connected to the first and fourth elements, for limiting differential rotation between the two rotating shafts by connecting and disconnecting between the first element and the fourth element.

With this arrangement, the first to fourth elements of the gear unit are capable of transmitting motive power therebetween. Further, the rotational speeds of the first to fourth elements are in the predetermined collinear relationship in which the rotational speeds are located on the same straight line in the collinear chart, and when the second to fourth elements are caused to rotate in the state in which the first element is fixed, the second to fourth elements rotate in the same direction, and the rotational speed of the fourth element becomes higher than the rotational speeds of the second and third elements. Furthermore, the first element is connected to the first torque generator, the second and third elements are connected to one of the two rotating shafts (hereinafter referred to as the "one rotating shaft"), and the other of the two rotating shafts (hereinafter referred to as the "other rotating shaft"), respectively, and the fourth element is connected to the second torque generator.

From the above, it is possible to transmit the positive torque and the negative torque generated by the first and second torque generators, to the two rotating shafts via the gear unit, to properly drive the rotating shafts. In this case, the rotational speeds of the first to fourth elements are in the collinear relationship with each other as described above, and hence by controlling the positive torque and the negative torque generated by the first and second torque generators, it is possible to properly control torque distributed to the two rotating shafts. Note that the phrase "negative torque generated by the first and second torque generators" refers to torque which acts as load on the first element and the fourth element connected to the first and second torque generators, respectively.

Further, differently from the above-described conventional case, to control the torque distributed to the two rotating shafts, not the speed-increasing and speed-reducing clutches formed by wet friction clutches but the first and second torque generators are used, and therefore no large dragging losses occur, and hence loss can be suppressed. In addition to this, it is possible to dispense with a hydraulic pump for supplying oil pressure to the speed-increasing and speed-reducing clutches. Furthermore, it is also possible to dispense with a spool valve, a solenoid, a strainer, and so forth, for driving the clutches, and attain downsizing of the power plant and enhancement of the mountability thereof accordingly.

With the above-described arrangement, the first element and the fourth element of the first to fourth elements the rotational speeds of which are in the collinear relationship are connected to and disconnected from each other by the differential limiting mechanism. This causes the first to fourth elements to rotate in unison with each other, and hence it is possible to limit differential rotation between the one rotating shaft having the second element connected thereto and the other rotating shaft having the third element connected thereto, whereby it is possible to enhance the stability of the behavior of the moving apparatus. In this case, it is only required to simply connect the differential limiting mechanism, and hence it is possible to easily limit the differential rotation between the two rotating shafts, and obtain high responsiveness of the differential limiting mechanism.

Further, as is apparent from the fact that the rotational speeds of the first to fourth elements are in the collinear relationship, and the fact that as described above, when the second to fourth elements are caused to rotate in the state of the first element being fixed, the second to fourth elements rotate in the same direction, and the rotational speed of the fourth element becomes higher than the rotational speeds of the second and third elements, the first element and the fourth element are positioned at opposite ends of the straight line in the collinear chart showing the relationship between the rotational speeds of the first to fourth elements. Therefore, by connecting the first element and the fourth element by the differential limiting mechanism, it is possible to maximize the total differential limiting torque (the sum total of differential limiting torques which act on the respective two rotating shafts such that the differential rotation between the rotating shafts is limited). This makes it possible to reduce reaction force torque required of the differential limiting mechanism to limit the differential rotation between the two rotating shafts, and hence it is possible to downsize the differential limiting mechanism, thereby making it possible to further downsize the power plant and enhance the mountability thereof.

The seventh aspect of the present application is the power plant 1A, 1D according to the above sixth aspect, further comprising a first power transmission mechanism (gear 51, gear 52) that is provided in a power transmission path between the first element and the differential limiting mechanism 41, for transmitting reaction force torque of the differential limiting mechanism 41, generated by connection between the first element and the fourth element by the differential limiting mechanism 41, to the first element, in an increased state, and a second power transmission mechanism (gear 53, gear 54) that is provided in a power transmission path between the fourth element and the differential limiting mechanism 41, for transmitting reaction force torque of the differential limiting mechanism 41, generated by connection between the first element and the fourth element by the differential limiting mechanism 41, to the fourth element, in an increased state.

The sixth aspect of the present application is formed by expressing the third to first sun gears and the carrier member of the above first aspect, as the first to fourth elements, in terms of more generic concepts, respectively. Therefore, similarly to the above second aspect, the total differential limiting torque becomes larger as the reaction force torque of the differential limiting mechanism, generated by the connection between the first element and the fourth element by the differential limiting mechanism is larger. With the above-described arrangement, the above reaction force torque of the differential limiting mechanism is transmitted to the first element in an increased state by the first power transmission mechanism, and is transmitted to the fourth element in an increased state by the second power transmission mechanism. Therefore, since the total differential limiting torque can be increased, it is possible to further reduce the reaction force torque required of the differential limiting mechanism to limit the differential rotation between the two rotating shafts, whereby it is possible to further downsize the differential limiting mechanism. In this case, for example, when relatively small-sized mechanisms, such as gears, are employed as the first and second power transmission mechanisms, a space necessary for arranging both the mechanisms is smaller than a space reduced by downsizing the above-described differential limiting mechanism. Therefore, by downsizing the differential limiting mechanism, it is possible to further downsize the power plant and enhance the mountability thereof.

The eighth aspect of the present application is the power plant 1C to 1E according to the above sixth or seventh aspect, further comprising a differential gear D that includes a fifth element (sun gear SD), a sixth element (carrier CD), and a seventh element (ring gear RD), which are differentially rotatable with each other, and a torque generator (engine 3) that is capable of generating positive torque, and is provided separately from the first and second torque generators, and wherein the fifth element is connected to the second element, the sixth element is provided in a power transmission path between the third element and the other of the two rotating shafts, and the seventh element is connected to the torque generator.

With this arrangement, the fifth to seventh elements of the differential gear are configured to be differentially rotatable with each other. Further, the fifth element is connected to the second element of the above-described gear unit, and is connected to the one rotating shaft via the second element. The sixth element is provided in the power transmission path between the third element of the gear unit and the other rotating shaft, and the seventh element is connected to the torque generator. Furthermore, the torque generator is provided separately from the first and second torque generators. From the above, in addition to the positive torque from the first and second torque generators, the positive torque from torque generator is transmitted to the two rotating shaft, and hence it is possible to reduce torque required of the first and second torque generators, thereby making it possible to downsize the torque generators.

The ninth aspect of the present application is the power plant 1, 1A to 1E according to any one of the above sixth to eighth aspects, wherein the first and second torque generators are rotating electric machines.

With this arrangement, general rotating electric machines are used as the first and second torque generators, and hence it is possible to construct the power plant easily and more inexpensively without using a special device. Further, in the case where distribution of torque to the two rotating shafts is controlled as described above, when negative torque is generated by the first and second torque generators, it is possible to convert motive power to electric power using the rotating electric machines. Therefore, for example, when the power plant is applied to a vehicle, by supplying the electric power obtained by the conversion to a vehicle accessory, it is possible to reduce the operating load and operating frequency of a generator for charging the power source of the accessory.

BRIEF DESCRIPTION OF THE DRAWINGS

FIG. 8 A diagram schematically showing an FR type vehicle to which the power transmission system according to the present invention is applied.

MODE FOR CARRYING OUT INVENTION

Figure 1:
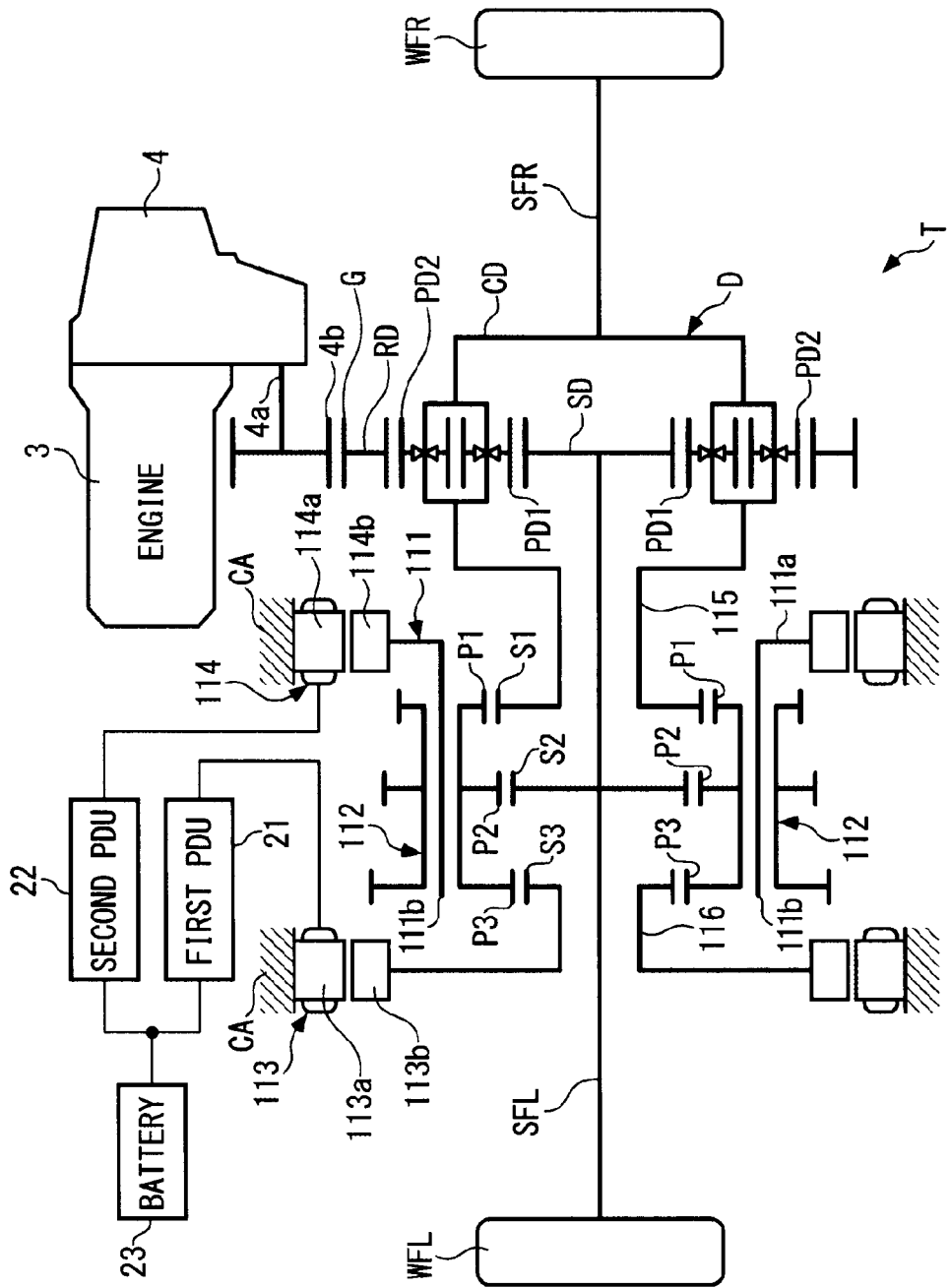
FIG. 1 A diagram schematically showing a power transmission system according to a first embodiment of the present invention together with drive wheels of a vehicle to which the power transmission system is applied.

The invention will now be described in detail with reference to drawings showing a preferred embodiment thereof. FIG. 1 shows an internal combustion engine (hereinafter referred to as the "engine") 3 which is installed on a four-wheel vehicle of FF (front-engine front-drive) type (not shown). A power transmission system T according to a first embodiment of the present invention is connected to the engine 3 via a transmission 4, and transmits torque of the engine 3 (hereinafter referred to as the "engine torque") to a left front wheel WFL and a right front wheel WFR of the vehicle.

The power transmission system T comprises a differential gear D, a carrier member 111, triple pinion gears 112, a first motor 113 and a second motor 114. The differential gear D, the carrier member 111, the first motor 113, and the second motor 114 are arranged coaxially with each other. The differential gear D is a planetary gear unit of a so-called double pinion type, and comprises a sun gear SD, a ring gear RD disposed around an outer periphery of the sun gear SD, a plurality of first pinion gears PD1 in mesh with the sun gear SD, a plurality of second pinion gears PD2 in mesh with the first pinion gears PD1 and the ring gear RD, and a carrier CD rotatably supporting the first and second pinion gears PD1 and PD2.

Further, an externally toothed gear G is formed around an outer periphery of the ring gear RD. This externally toothed gear G is in mesh with a gear 4b integrally attached to an output shaft 4a of the transmission 4. The carrier CD has a right end integrally attached to a right output shaft SFR. The right output shaft SFR is connected to the right front wheel WFR. Further, a hollow cylindrical rotating shaft 115 is integrally attached to a left end of the carrier CD, and is rotatably supported by a bearing (not shown). Furthermore, the sun gear SD is integrally attached to a left output shaft SFL. The left output shaft SFL is relatively rotatably disposed inside the rotating shaft 115, and is connected to the left front wheel WFL.

In the differential gear D configured as above, when the engine torque is transmitted to the ring gear RD via the transmission 4, the torque transmitted to the ring gear RD is distributed to the sun gear SD and the carrier CD via the first and second pinion gears PD1 and PD2 at a torque distribution ratio of 1:1. The torque distributed to the sun gear SD is transmitted to the left front wheel WFL via the left output shaft SFL, and the torque distributed to the carrier CD is transmitted to the right front wheel WFR via the right output shaft SFR. Further, the left and right output shafts SFL and SFR can be differentially rotated with each other by the differential gear D.

The carrier member 111 comprises an annular plate-shaped root portion 111a and four support shafts 111b (only two of which are shown) for supporting the triple pinion gears 112. The carrier member 111 is rotatably supported by a bearing (not shown), and is disposed around the left output shaft SFL and the rotating shaft 115. Each support shaft 111b is integrally attached to the root portion 111a, and extends from the root portion 111a in the axial direction. Further, the four support shafts 111b are arranged at equally-spaced intervals in the circumferential direction of the root portion 111a.

The triple pinion gears 112 each comprise a first pinion gear P1, a second pinion gear P2, and a third pinion gear P3, which are integrally formed with each other. The number N of the triple pinion gears 112 is 4 (only two of which are shown), and each triple pinion gear 112 is rotatably supported on an associated one of the support shafts 111b. The first to third pinion gears P1 to P3 are arranged on the same axis parallel to the axis of the carrier member 111 from the right side in the mentioned order. Note that the number N of the triple pinion gears 112 and the number of the support shafts 111b are not limited to 4 but they can be set as desired.

The first to third pinion gears P1 to P3 have pitch circle diameters different from each other, and the number of the gear teeth of the first pinion gear P1 (hereinafter referred to as the "first pinion tooth number") ZP1, the number of the gear teeth of the second pinion gear P2 (hereinafter referred to as the "second pinion tooth number") ZP2, and the number of the gear teeth of the third pinion gear P3 (hereinafter referred to as the "third pinion tooth number") ZP3 are set to values obtained by multiplying a minimum tooth number M thereof by respective positive integers (ones of M, 2M, 3M . . . ). Specifically, the first and second pinion tooth numbers ZP1 and ZP2 are set to the minimum tooth numbers M=17, and the third pinion tooth number ZP3 is set to 2M=34. This makes it possible to align the phases of the gear teeth of the first to third pinion gears P1 to P3 with each other in the circumferential direction. With this configuration, when the triple pinion gears 112 are assembled, it is possible to dispense with positioning of the triple pinion gears 112 in the circumferential direction (the direction of rotation thereof), before bringing the first to third pinion gears P1, P2, and P3 into mesh with a first sun gear S1, a second sun gear S2 and a third sun gear S3, referred to hereinafter, respectively, whereby it is possible to enhance assemblability of the triple pinion gears 112.

Further, the first sun gear S1, the second sun gear S2, and the third sun gear S3 are in mesh with the first to third pinion gears P1, P2 and P3, respectively. The first sun gear S1 is integrally attached to the rotating shaft 115, and the second sun gear S2 is integrally attached to the left output shaft SFL. The third sun gear S3 is integrally attached to a rotating shaft 116. The rotating shaft 116 is rotatably supported by a bearing (not shown), and the left output shaft SFL is relatively rotatably disposed inside the rotating shaft 116.

Further, the number of the gear teeth of the first sun gear S1 (hereinafter referred to as the "first sun gear tooth number") ZS1, the number of the gear teeth of the second sun gear S2 (hereinafter referred to as the "second sun gear tooth number") ZS2, and the number of the gear teeth of the third sun gear S3 (hereinafter referred to as the "third sun gear tooth number") ZS3 are set to values obtained by multiplying the number N of the triple pinion gears 112 (4, in the present embodiment) by respective positive integers (ones of N, 2N, 3N . . . ). Specifically, the first and third sun gear tooth numbers ZS1 and ZS3 are set to 8N=32, and the second sun gear tooth number ZS2 is set to 7N=28. This makes it possible to cause the phases of the gear teeth of the first to third sun gears S1 to S3 to coincide with each other at a position where the first to third sun gears S1 to S3 are in mesh with the four triple pinion gears 112. With this configuration, the phases of the gear teeth of the first to third pinion gears P1 to P3 are not required to be made different from each other, and hence it is possible to reduce the manufacturing costs of the triple pinion gears 112.

Note that if the modules of the first pinion gear P1 and the first sun gear S1 in mesh with each other are caused to coincide with each other, the modules of the second pinion gear P2 and the second sun gear S2 in mesh with each other are caused to coincide with each other, and the modules of the third pinion gear P3 and the third sun gear S3 in mesh with each other are caused to coincide with each other, there is no need to cause all the modules of the first to third pinion gears P1 to P3 and the first to third sun gears S1 to S3 to coincide with each other.

The first motor 113 is an AC motor, and includes a first stator 113a formed e.g. by a plurality of iron cores and coils, and a first rotor 113b formed e.g. by a plurality of magnets. The first stator 113a is fixed to an immovable casing CA. The first rotor 113b is disposed in a manner opposed to the first stator 113a, and is integrally attached to the above-mentioned rotating shaft 116 such that it is rotatable together with the rotating shaft 116 and the third sun gear S3. In the first motor 113, when electric power (electric energy) is supplied to the first stator 113a, the supplied electric power is converted to motive power (rotational energy), and is output to the first rotor 113b. Further, when the motive power (rotational energy) is input to the first rotor 113b, this motive power is converted to electric power (electric energy) (electric power generation), and is output to the first stator 113a.

Figure 2:
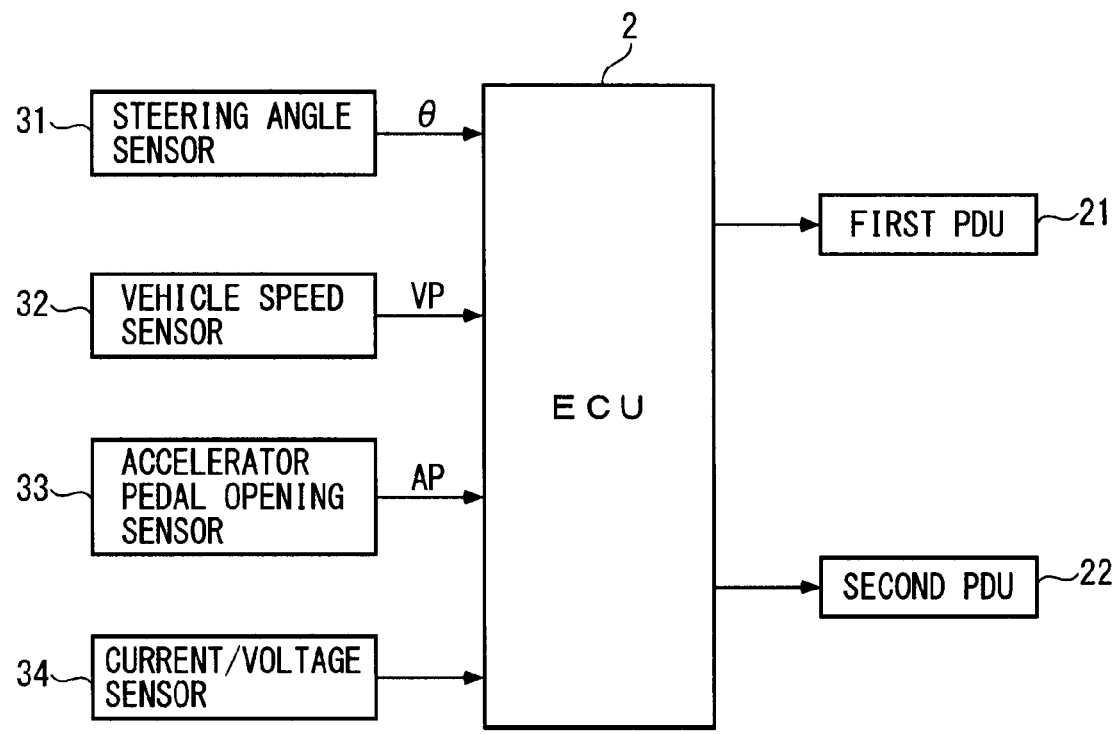
FIG. 2 A block diagram showing an ECU etc.

Further, the first stator 113a is electrically connected to a battery 23 capable of being charged and discharged, via a first power drive unit (hereinafter referred to as the "first PDU") 21, and is capable of supplying and receiving electric energy to and from the battery 23. The first PDU 21 is formed by an electric circuit comprising an inverter. As shown in FIG. 2, an ECU 2, described hereinafter, is electrically connected to the first PDU 21. The ECU 2 controls the first PDU 21 to thereby control electric power supplied to the first stator 113a, electric power generated by the first stator 113a, and the rotational speed of the first rotor 113b.

Similarly to the first motor 113, the second motor 114 as well is an AC motor, and includes a second stator 114a and a second rotor 114b. The second stator 114a and the second rotor 114b are constructed similarly to the first stator 113a and the first rotor 113b, respectively. Further, the second rotor 114b is integrally attached to the root portion 111a of the above-described carrier member 111, and is rotatable together with the carrier member 111. Furthermore, similarly to the first motor 113, the second motor 114 is capable of converting electric power supplied to the second stator 114a to motive power and outputting the motive power to the second rotor 114b, and is capable of converting the motive power input to the second rotor 114b to electric power and outputting the electric power to the second stator 114a.

Further, the second stator 114a is electrically connected to the battery 23 via a second power drive unit (hereinafter referred to as the "second PDU") 22, and is capable of supplying and receiving electric energy to and from the battery 23. Similarly to the first PDU 21, the second PDU 22 is formed by an electric circuit comprising an inverter. The ECU 2 is electrically connected to the second PDU 22. The ECU 2 controls the second PDU 22 to thereby control electric power supplied to the second stator 114a, electric power generated by the second stator 114a, and the rotational speed of the second rotor 114b.

As described above, in the power transmission system T, the first pinion gear P1 of each triple pinion gear 112 is connected to the right output shaft SFR via the first sun gear S1, the rotating shaft 115, and the carrier CD. The second pinion gear P2 is connected to the left output shaft SFL via the second sun gear S2. Further, the third pinion gear P3 is connected to the first motor 113 via the third sun gear S3 and the rotating shaft 116. The carrier member 111 is connected to the second motor 114.

Further, as shown in FIG. 2, input to the ECU 2 are a detection signal indicative of a steering angle θ of a steering wheel (not shown) of the vehicle from a steering angle sensor 31, a detection signal indicative of a vehicle speed VP from a vehicle speed sensor 32, and a detection signal indicative of an operation amount of an accelerator pedal (not shown) of the vehicle (hereinafter referred to as the "accelerator pedal opening") AP from an accelerator pedal opening sensor 33. Further, detection signals indicative of current and voltage values of electric current flowing into and out of the battery 23 are input from a current/voltage sensor 34 to the ECU 2. The ECU 2 calculates a state of charge of the battery 23 based on the detection signals from the current/voltage sensor 34.

The ECU 2 is implemented by a microcomputer comprising an I/O interface, a CPU, a RAM, and a ROM, and controls the first and second motors 113 and 114 based on the detection signals from the aforementioned sensors 31 to 34, according to control programs stored in the ROM. With this control, various operations of the power transmission system T are performed. Hereafter, a description will be given of the operations of the power transmission system T during straight forward traveling and during left and right turning of the vehicle.

[During Straight Forward Traveling]

As is apparent from a relationship of connections between the above-described elements, such as the engine 3 and the first and second motors 113 and 114, the engine torque is transmitted to the first and second motors 113 and 114 via the differential gear D, the carrier member 111, and the triple pinion gears 112. This causes the carrier member 111, and the first and second rotors 113b and 114b to idly rotate. To avoid dragging losses from being caused by electric power generation by the first and second motors 113 and 114 along with the idle rotation, zero torque control is performed such that torque of the motors 113 and 114 becomes substantially equal to 0.

Figure 3:
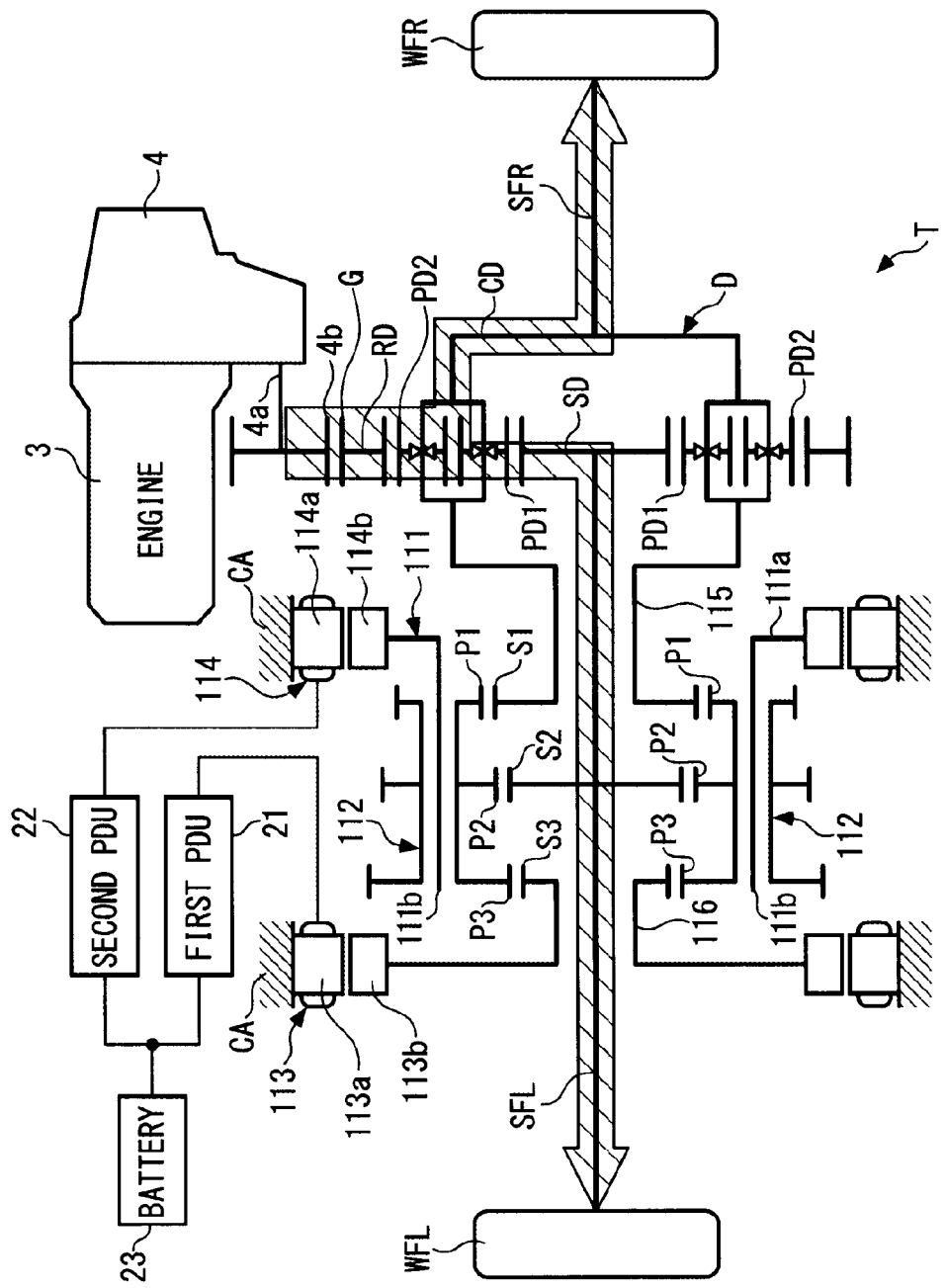
FIG. 3 A view showing a state of transmission of torque in the power transmission system during straight forward traveling of the vehicle.

During the straight forward traveling of the vehicle, the engine torque is distributed to the left and right output shafts SFL and SFR via the differential gear D, and is further transmitted to the left and right drive wheels WFL and WFR. In this case, as indicated by hatched arrows in FIG. 3, a torque distribution ratio for distributing the engine torque from the engine 3 to the left and right output shafts SFL and SFR is 1:1. Further, differently from during the left and right turning of the vehicle, the carrier member 111 idly rotates at the same rotational speed as that of the left and right output shafts SFL and SFR, whereas the triple pinion gears 112 do not rotate with respect to the carrier member 111, so that no torque is transmitted between the left and right output shafts SFL and SFR via the triple pinion gears 112.

[During Left Turning]

Figure 4:
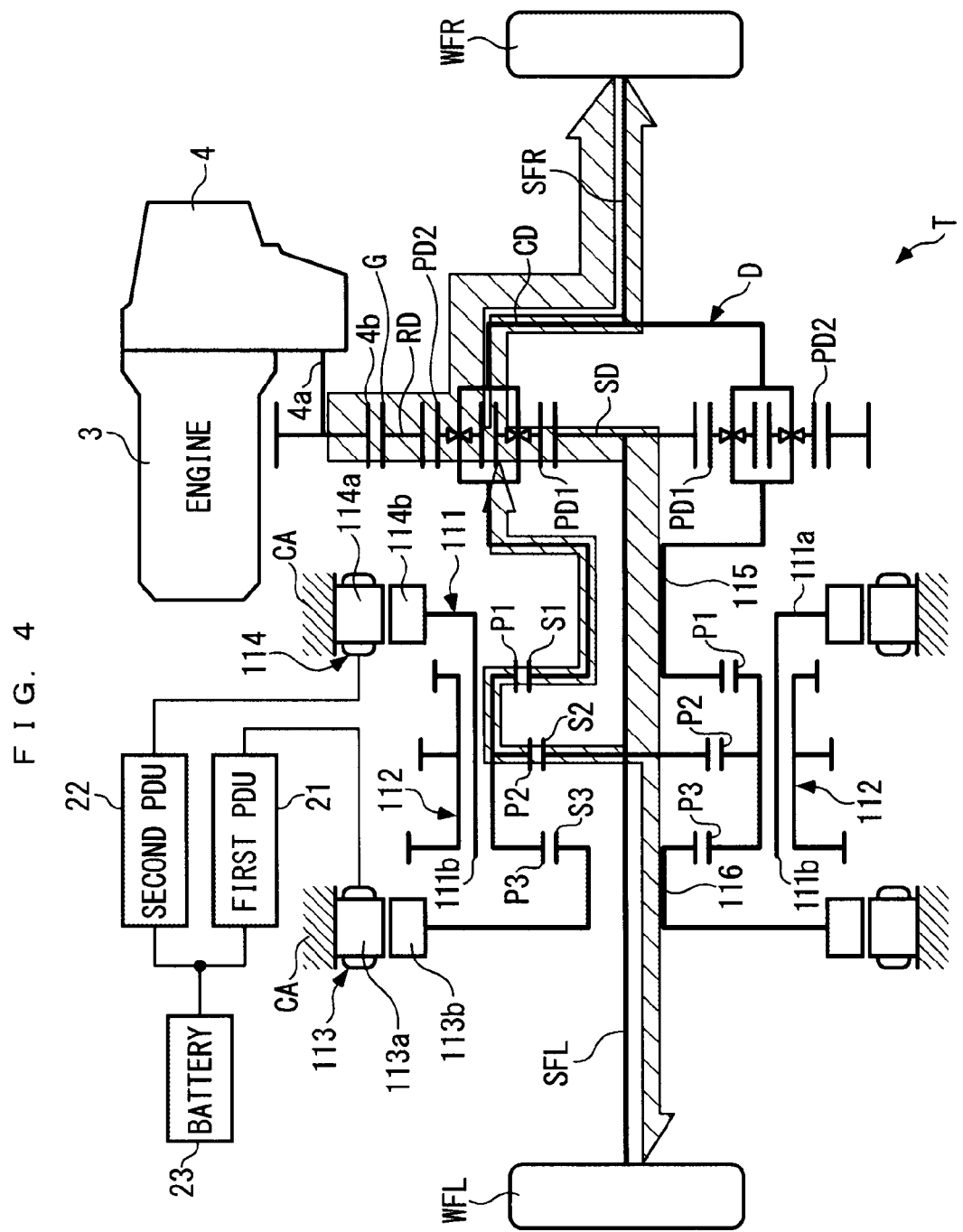
FIG. 4 A view showing a state of transmission of torque in the power transmission system during left turning of the vehicle.

Power generation control is performed by the first motor 113, and the zero torque control is performed by the second motor 114. As the power generation control is performed by the first motor 113, a braking force from the first motor 113 acts on the third sun gear S3. Further, rotational energy transmitted to the first motor 113 is converted to electric energy by the power generation control by the first motor 113, and the electric energy obtained by the conversion is charged into the battery 23. This increases the rotational speed of the carrier member 111 with respect to that of the left output shaft SFL, whereby as indicated by hatched arrows in FIG. 4, part of the torque of the left output shaft SFL is transmitted to the right output shaft SFR via the second sun gear S2, the second pinion gear P2, the first pinion gear P1, the first sun gear S1, the rotating shaft 115, and the carrier CD. As a consequence, the rotational speed of the right output shaft SFR (hereinafter referred to as the "right output shaft rotational speed") NFR is increased with respect to the rotational speed of the left output shaft SFL (hereinafter referred to as the "left output shaft rotational speed") NFL.

During the left turning, when the first motor 113 is controlled such that the rotational speed of the first rotor 113b becomes equal to 0, the relationship between the left and right output shaft rotational speeds NFL and NFR is expressed by the following equation (1):

$$NFR/NFL = \{1-(ZS3/ZP3) \times (ZP1/ZS1)\}/\{1-(ZS3/ZP3) \times (ZP2/ZS2)\} = 1.167 \qquad (1)$$

Further, during the left turning, the degree of increase in the rotational speed of the carrier member 111 with respect to that of the left output shaft SFL is controlled by controlling the braking force from the first motor 113 using electric power generated by the first motor 113, whereby it is possible to freely control the torque transmitted from the left output shaft SFL to the right output shaft SFR.

[During Right Turning]

Figure 5:
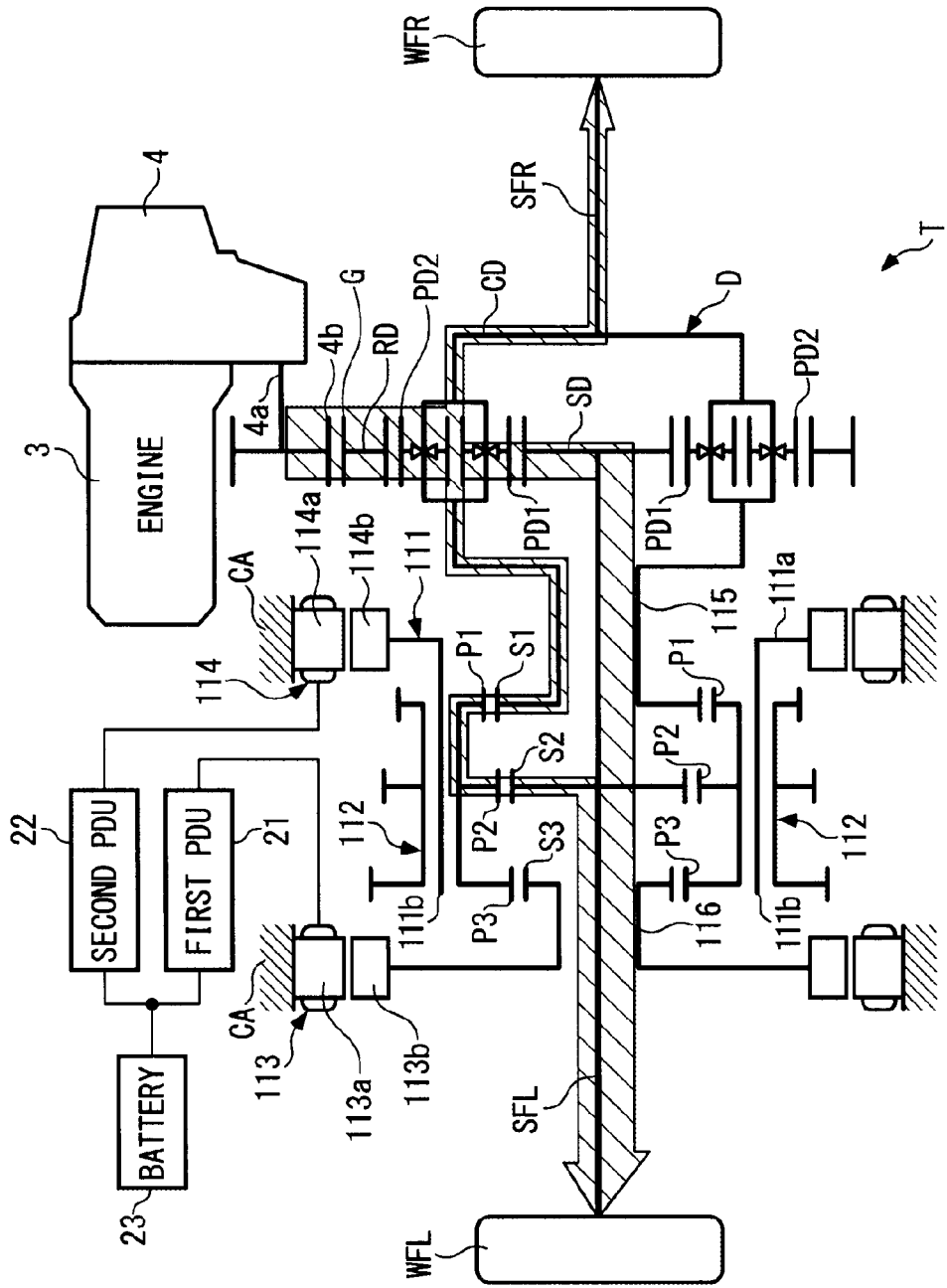
FIG. 5 A view showing a state of transmission of torque in the power transmission system during right turning of the vehicle.

During the right turning, inversely to the case of the above-described left turning, power generation control is performed by the second motor 114, and the zero torque control is performed by the first motor 113. As the power generation control is performed by the second motor 114, a braking force from the second motor 114 acts on the carrier member 111. Further, rotational energy transmitted to the second motor 114 is converted to electric energy by the power generation control by the second motor 114, and the electric energy obtained by the conversion is charged into the battery 23. This reduces the rotational speed of the carrier member 111 with respect to that of the left output shaft SFL, whereby as indicated by hatched arrows in FIG. 5, part of the torque of the right output shaft SFR is transmitted to the left output shaft SFL via the carrier CD, the rotating shaft 115, the first sun gear S1, the first pinion gear P1, the second pinion gear P2, and second sun gear S2. As a consequence, the left output shaft rotational speed NFL is increased with respect to the right output shaft rotational speed NFR.

During the right turning, when the second motor 114 is controlled such that the rotational speed of the second rotor 114b becomes equal to 0, the relationship between the left and right output shaft rotational speeds NFL and NFR is expressed by the following equation (2):

$$NFL/NFR=(ZP2/ZS2)\times(ZS1/ZP1)=1.143 \qquad (2)$$

Further, during the right turning, the degree of the reduction in the rotational speed of the carrier member 111 with respect to that of the left output shaft SFL is controlled by controlling the braking force from the second motor 114 using electric power generated by the second motor 114, whereby it is possible to freely control the torque transmitted from the right output shaft SFR to the left output shaft SFL.

Further, the correspondence between various elements of the present embodiment and various elements of the present invention is as follows: The left and right output shafts SFL and SFR in the present embodiment correspond to one and the other of the two rotating shafts in the present invention, respectively. Further, the first motor 113 in the present embodiment corresponds to a first torque generator in the present invention, and the second motor 114 in the present embodiment corresponds to a second torque generator in the present invention. Furthermore, the first and second motors 113 and 114 in the present embodiment correspond to rotating electric machines in the present invention.

As described above, according to the first embodiment, the triple pinion gears 112 are rotatably supported by the carrier member 111 which is rotatably disposed around the left output shaft SFL. Each triple pinion gear 112 comprises the first to third pinion gears P1 to P3 having pitch circles different from each other and integrally formed with each other. Further, the first and second pinion gears P1 and P2 are connected to the right output shaft SFR and the left output shaft SFL, respectively, and the third pinion gear P3 and the carrier member 111 are connected to the first and second motors 113 and 114, respectively. Furthermore, the battery 23 is connected to the first and second motors 113 and 114. The first and second motors 113 and 114 are capable of recovering rotational energy as electric energy for accumulation.

Further, during the left turning of the vehicle, rotational energy transmitted to the first motor 113 is recovered by performing power generation control by the first motor 113, whereby the rotational speed of the carrier member 111 is increased with respect to that of the left output shaft SFL. Further, by controlling the degree of increase in the rotational speed of the carrier member 111, it is possible to freely control torque transmitted from the left output shaft SFL to the right output shaft SFR.

Furthermore, during the right turning of the vehicle, rotational energy transmitted to the second motor 114 is recovered by performing power generation control by the second motor 114, whereby the rotational speed of the carrier member 111 is reduced with respect to that of the left output shaft SFL. Further, by controlling the degree of reduction in the rotational speed of the carrier member 111, it is possible to freely control torque transmitted from the right output shaft SFR to the left output shaft SFL. As described above, distribution of torque to the left and right output shafts SFL and SFR can be freely controlled. Hereinafter, control of the distribution of torque to the left and right output shafts SFL and SFR is referred to as the "torque distribution control".

Further, to perform the torque distribution control, the first and second motors 113 and 114 are used in place of the above-described conventional speed-increasing and speed-reducing clutches, and hence during the torque distribution control, rotational energy transmitted to the first and second motors 113 and 114 can be recovered for reuse, which makes it possible to suppress loss as a whole. Particularly differently from the case where the speed-increasing and speed-reducing clutches are wet friction clutches, the aforementioned zero torque control prevents occurrence of large dragging losses, which also makes it possible to suppress loss. In addition to this, it is also possible to dispense with a hydraulic pump for supplying oil pressure to the speed-increasing and speed-reducing clutches. Furthermore, it is also possible to dispense with a spool valve for actuating the speed-increasing and speed-reducing clutches, a solenoid, a strainer, and so forth, which makes it possible to downsize the power transmission system T and enhance mountability thereof.

Further, during the torque distribution control, when recovering rotational energy transmitted to the first and second motors 113 and 114, it is possible to convert the rotational energy to electric energy using the first and second motors 113 and 114. Therefore, for example, by supplying the electric energy obtained by the conversion to a vehicle accessory (not shown), it is possible to reduce the operating load and operating frequency of a generator (not shown) for charging the power source of the accessory.

Furthermore, during deceleration of the vehicle, the power generation control can be performed by the first and second motors 113 and 114 by using motive power transmitted from the left and right front wheels WFL and WFR to the first and second motors 113 and 114 e.g. via the left and right output shafts SFL and SFR and the differential gear D, whereby it is possible to recover the traveling energy of the vehicle.

Figure 6:
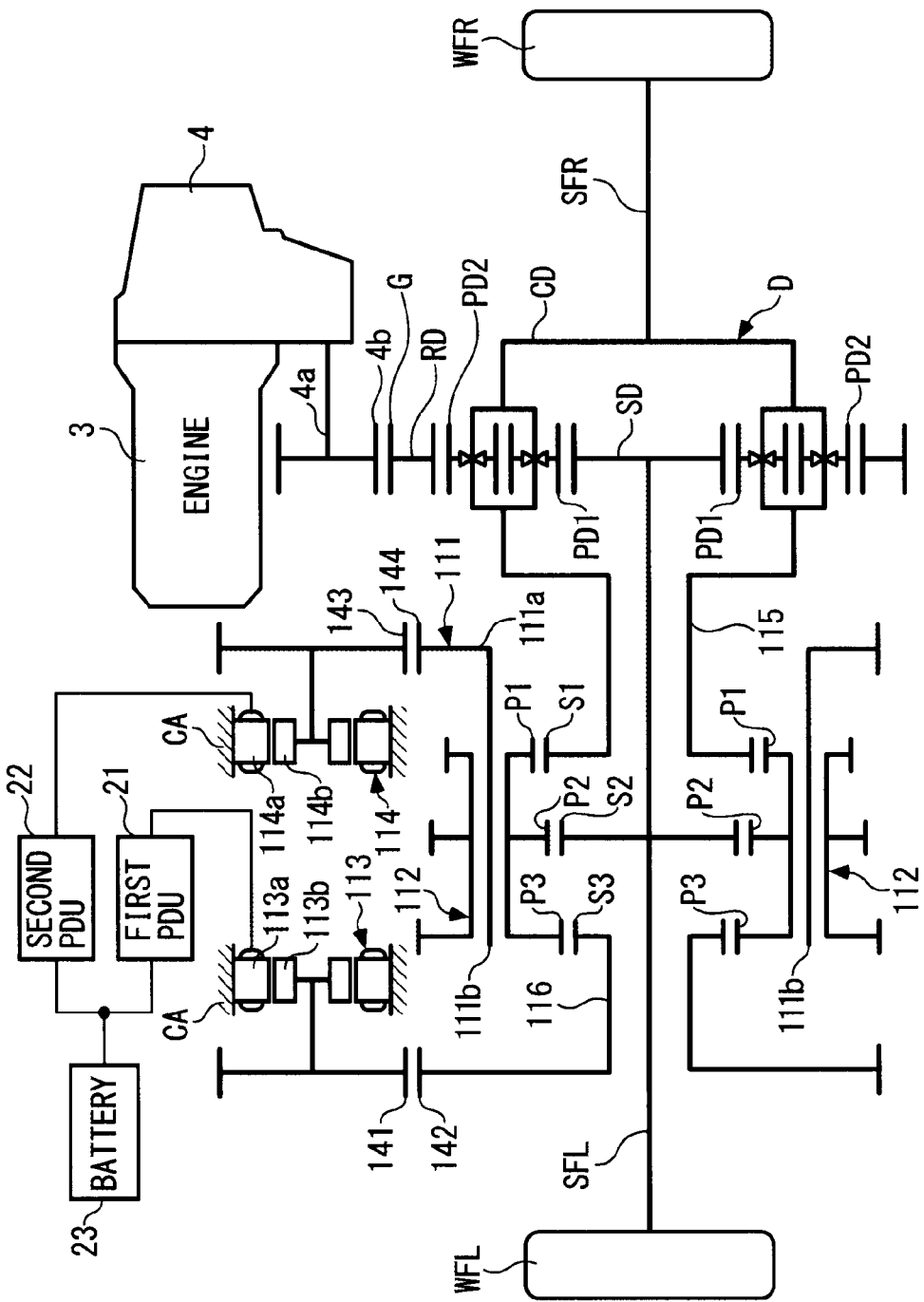
FIG. 6 A diagram schematically showing a power transmission system according to a second embodiment of the present invention together with drive wheels of a vehicle to which the power transmission system is applied.

Next, a power transmission system according to a second embodiment of the present invention will be described with reference to FIG. 6. In this power transmission system, differently from the power transmission system T according to the first embodiment, the first and second motors 113 and 114 are not directly connected to the third sun gear S3 and the carrier member 111, respectively, but connected via a reduction gear. In FIG. 6, the same component elements as those of the first embodiment are denoted by the same reference numerals. The following description is mainly given of different points of the power transmission system from the first embodiment.

The first rotor 113b is not attached to the rotating shaft 116. A gear 141 and a gear 142 are integrally attached to the first rotor 113b and the rotating shaft 116, respectively. These gears 141 and 142 are in mesh with each other. Motive power of the first motor 113 is transmitted to the third sun gear S3 in a state reduced in speed by the gears 141 and 142. Further, the second rotor 114*b* is not attached to the carrier member 111, and a gear 143 and a gear 144 are integrally attached to the second rotor 114*b* and the root portion 111*a* of the carrier member 111, respectively. These gears 143 and 144 are in mesh with each other. Motive power of the second motor 114 is transmitted to the carrier member 111 in a state reduced in speed by the gears 143 and 144.

As described hereinabove, in the second embodiment, the first motor 113 is connected to the third sun gear S3 via a reduction gear comprising the gear 141 and the gear 142, and the second motor 114 is connected to the carrier member 111 via a reduction gear comprising the gear 143 and the gear 144. This makes it possible to transmit torque (braking forces) of the first and second motors 113 and 114 to the third sun gear S3 and the carrier member 111 in a an increased state, respectively, so that it is possible to downsize the first and second motors 113 and 114. In addition to this, it is possible to obtain the same advantageous effects as provided by the first embodiment.

Figure 7:
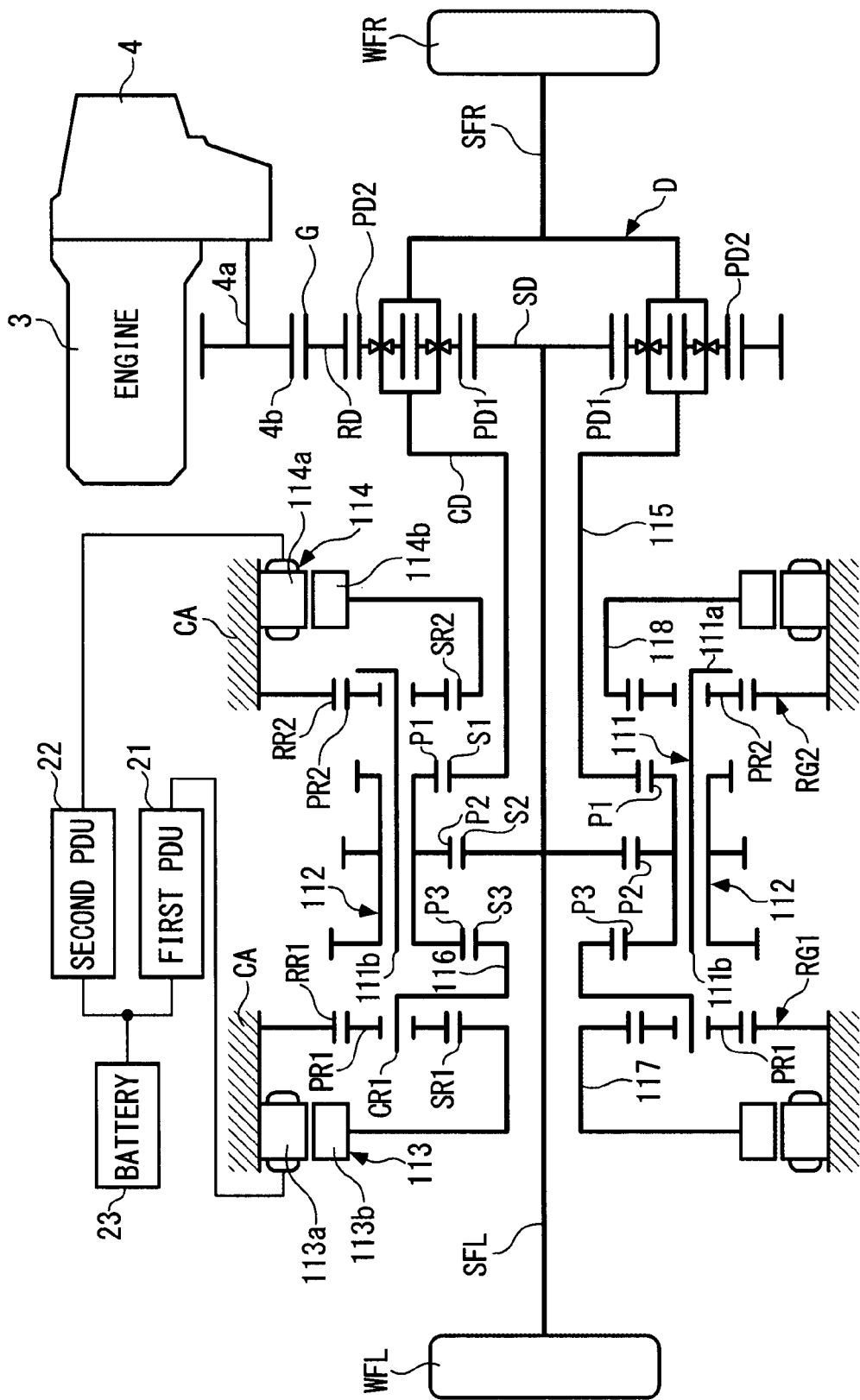
FIG. 7 A diagram schematically showing a power transmission system according to a third embodiment of the present invention together with drive wheels of a vehicle to which the power transmission system is applied.

Next, a power transmission system according to a third embodiment of the present invention will be described with reference to FIG. 7. In this power transmission system, differently from the power transmission system according to the second embodiment, the first and second motors 113 and 114 are connected to the third sun gear S3 and the carrier member 111, respectively, not via a reduction gear comprising a pair of gears but via a first reduction gear RG1 and a second reduction gear RG2 each of a planetary gear type. In FIG. 7, the same component elements as those of the first and second embodiments are denoted by the same reference numerals. The following description is mainly given of different points of the power transmission system from the first and second embodiments.

The first reduction gear RG1 is a planetary gear unit of a single pinion type, and comprises a first sun gear SR1, a first ring gear RR1 disposed around an outer periphery of the first sun gear SR1, a plurality of first pinion gears PR1 in mesh with the gears SR1 and RR1, and a first carrier CR1 rotatably supporting the first pinion gears PR1.

The first sun gear SR1 is integrally attached to a hollow cylindrical rotating shaft 117. The rotating shaft 117 is rotatably supported by a bearing (not shown), and the left output shaft SFL is relatively rotatably disposed inside the rotating shaft 117. Further, the first rotor 113*b* is integrally attached not to the above-described rotating shaft 116 but to the rotating shaft 117, and is rotatable together with the rotating shaft 117 and the first sun gear SR1. The first ring gear RR1 is fixed to the casing CA. The first carrier CR1 is integrally attached to the rotating shaft 116, and is rotatable together with the rotating shaft 116 and the third sun gear S3. Motive power of the first motor 113 is transmitted to the third sun gear SR3 in a state reduced in speed by the first reduction gear RG1 constructed as above.

The above-mentioned second reduction gear RG2 is a planetary gear unit of a single pinion type, similarly to the first reduction gear RG1, and comprises a second sun gear SR2, a second ring gear RR2 disposed around an outer periphery of the second sun gear SR2, and second pinion gears PR2 in mesh with the gears SR2 and RR2.

The second sun gear SR2 is integrally attached to a hollow cylindrical rotating shaft 118. The rotating shaft 118 is rotatably supported by a bearing (not shown), and the above-described rotating shaft 115 and left output shaft SFL are relatively rotatably disposed inside the rotating shaft 118. Further, the second rotor 114*b* is integrally attached not to the carrier member 111 but to the rotating shaft 118, and is rotatable together with the rotating shaft 118 and the second sun gear SR2. The second ring gear RR2 is fixed to the casing CA. The second pinion gears PR2 are equal in number (four, only two of which are shown) to the triple pinion gears 112, and are rotatably supported on the support shafts 111*b* of the carrier member 111. Motive power of the second motor 114 is transmitted to the carrier member 111 in a state reduced in speed by the second reduction gear RG2 constructed as above.

As described hereinabove, in the third embodiment, the first motor 113 is connected to the third sun gear S3 via the first reduction gear RG1, and the second motor 114 is connected to the carrier member 111 via the second reduction gear RG2. This makes it possible, similarly to the second embodiment, to transmit torque (braking forces) of the first and second motors 113 and 114 to the third sun gear S3 and the carrier member 111 in an increased state, respectively, so that it is possible to downsize the first and second motors 113 and 114. In addition to this, it is possible to obtain the same advantageous effects as provided by the first embodiment.

Further, since the carrier member 111 supporting the triple pinion gears 112 and the second pinion gears PR2 is shared, it is possible to downsize the power transmission system and enhance mountability thereof.

As shown in FIG. 8, the power transmission system according to the present invention can also be applied to a vehicle VFR of an FR (front-engine rear-drive) type. In this vehicle VFR, a power transmission system TA is arranged in a rear part of the vehicle VFR, and the above-described ring gear (not shown) of the differential gear D is connected to the transmission 4 via a propeller shaft PS. Further, the sun gear and the carrier (none of which are shown) of the differential gear D are connected to left and right rear wheels WRL and WRR via left and right output shafts SRL and SRR, respectively. With the above arrangement, engine torque is transmitted to the left and right rear wheels WRL and WRR via the transmission 4, the propeller shaft PS, the power transmission system TA, and the left and right output shafts SRL and SRR, respectively. In this case as well, it is possible to obtain the same advantageous effects as provided by the first to third embodiments.

Figure 9:
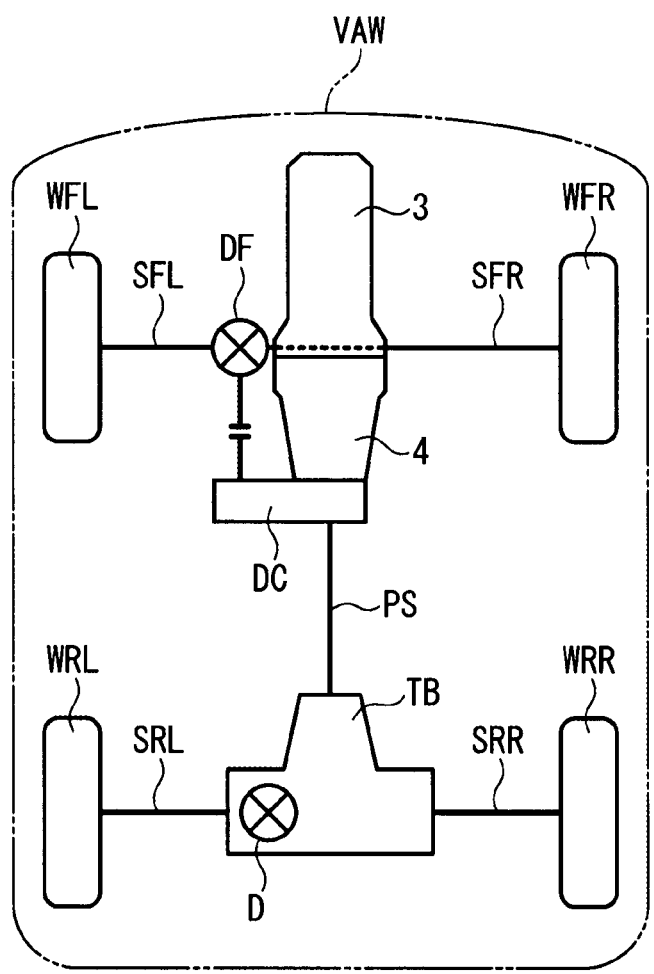
FIG. 9 A diagram schematically showing an all-wheel drive vehicle to which the power transmission system according to the present invention is applied.

Furthermore, as shown in FIG. 9, the power transmission system according to the present invention can also be applied to an all-wheel drive vehicle VAW. In this vehicle VAW, the left and right output shafts SFL and SFR are connected to the engine 3 via a front differential DF, a center differential DC, and the transmission 4. Further, a power transmission system TB is arranged in a rear part of the vehicle VAW, and the ring gear (not shown) of the differential gear D is connected to the transmission 4 via the propeller shaft PS and the center differential DC. Further, the sun gear and the carrier (none of which are shown) of the differential gear D are connected to the left and right rear wheels WRL and WRR via the left and right output shafts SRL and SRR, respectively.

With the above arrangement, engine torque is transmitted to the center differential DC via the transmission 4, and is distributed to the front differential DF and the propeller shaft PS. The torque distributed to the front differential DF is transmitted to the left and right front wheels WFL and WFR via the left and right output shafts SFL and SFR, respectively. The torque distributed to the propeller shaft PS is transmitted to the left and right rear wheels WRL and WRR via the power transmission system TB and the left and right output shafts SRL and SRR, respectively. In this case as well, it is possible to obtain the same advantageous effects as provided by the first to third embodiments.

Note that the present invention is by no means limited to the first to third embodiments (including the variation) described above, but can be practiced in various forms. For example, although in the above-described first to third embodiments, the carrier member 111 is rotatably disposed around the left output shaft SFL (SRL), it may be rotatably disposed around the right output shaft SFR (SRR).

Further, although in the above-described first to third embodiments, the power transmission system according to the present invention is configured such that torque is transmitted between the left and right output shafts SFL and SFR (SRL and SRR), the power transmission system may be configured such that torque is transmitted between the front and rear drive wheels of the all-wheel drive vehicle. Alternatively, the power transmission system may be configured such that torque is transmitted between non-drive wheels which are not driven directly by a motive power source, such as that of the engine 3.

Figure 10:
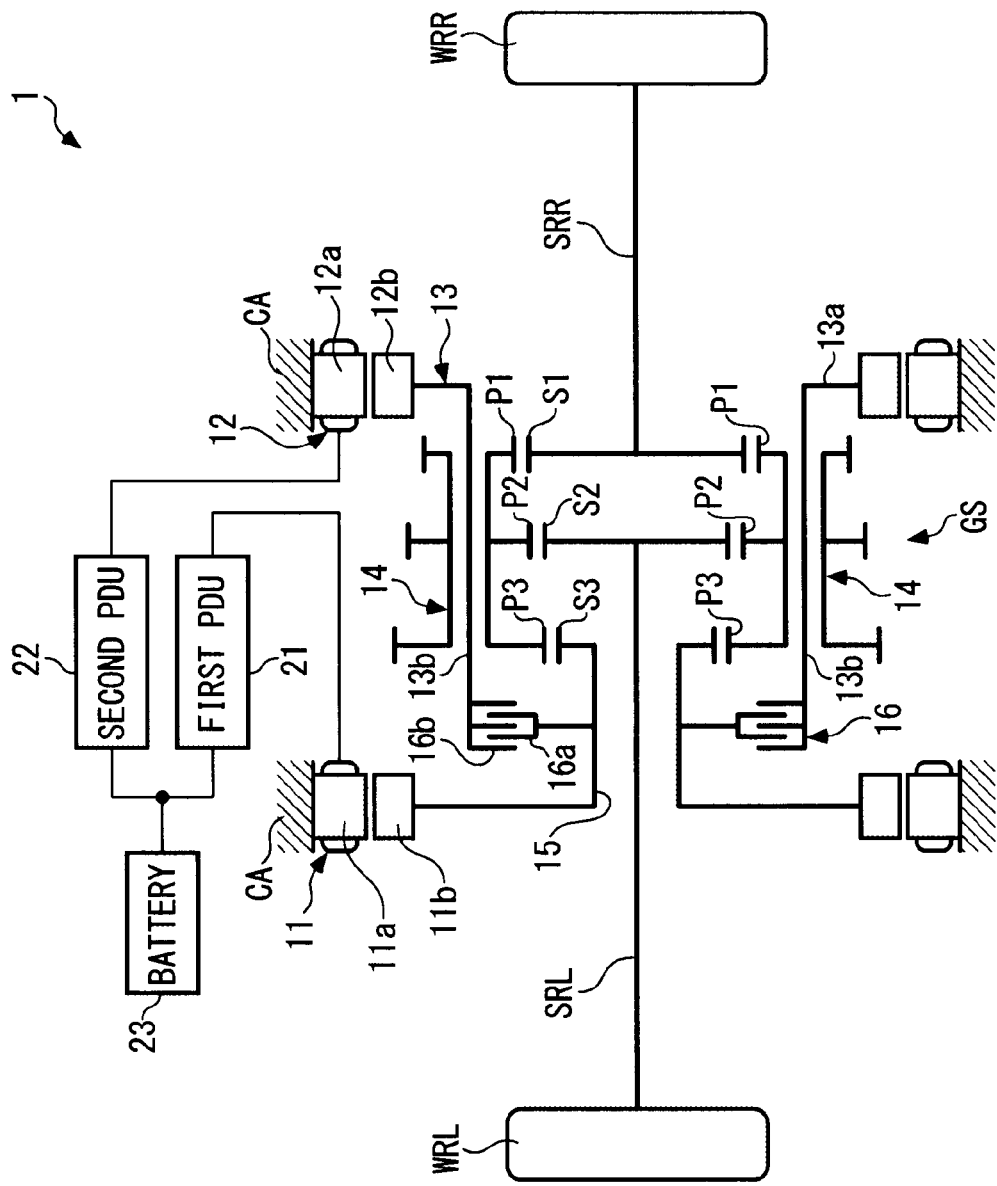
FIG. 10 A diagram schematically showing a power plant according to a fourth embodiment of the present invention together with rear wheels of a vehicle to which the power transmission system is applied.

Next, a fourth embodiment of the present invention will be described with reference to FIG. 10. In the figure, the same component elements as those of the first embodiment are denoted by the same reference numerals. The following description is mainly given of different points from the first embodiment. A power plant 1 according to the fourth embodiment drives the left and right output shafts SRL and SRR of a four-wheel vehicle (not shown), and is mounted in a rear part of the vehicle. These left and right output shafts SRL and SRR are arranged coaxially with each other, and are connected to the left and right rear wheels WRL and WRR, respectively. Further, an engine (not shown) as a motive power source is mounted in a front part of the vehicle. The engine is a gasoline engine, and is connected to left and right front wheels (not shown) of the vehicle via a transmission (not shown) for driving the left and right front wheels.

The power plant 1 includes a gear unit GS, a first rotating electric machine 11 and a second rotating electric machine 12 as motive power sources. The gear unit GS transmits torque between the first and second rotating electric machines 11 and 12, and the left and right output shafts SRL and SRR, and comprises a carrier member 13, triple pinion gears 14, and the first sun gear S1, the second sun gear S2, and the third sun gear S3, described in the first embodiment.

Similarly to the carrier member 111 described in the first embodiment, the carrier member 13 comprises an annular plate-shaped root portion 13a and four support shafts 13b (only two of which are shown) for supporting the triple pinion gears 14. The carrier member 13 is rotatably supported by a bearing (not shown), and is disposed around the left and right output shafts SRL and SRR. Each support shaft 13b is integrally attached to the root portion 13a, and extends from the root portion 13a in the axial direction. Further, the four support shafts 13b are arranged at equally-spaced intervals in the circumferential direction of the root portion 13a.

Similarly to the triple pinion gears 112 described in the first embodiment, the triple pinion gears 14 each comprise the first pinion gear P1, the second pinion gear P2, and the third pinion gear P3, which are integrally formed with each other. The number N of the triple pinion gears 14 is 4 (only two of which are shown), and each triple pinion gear 14 is rotatably supported on an associated one of the support shafts 13b. The first to third pinion gears P1 to P3 are arranged on the same axis parallel to the axis of the carrier member 13 from the right side in the mentioned order. Note that the number N of the triple pinion gears 14 and the number of the support shafts 13b are not limited to 4 but they can be set as desired. The pitch circle diameters and the number of the gear teeth of the first to third pinion gears P1 to P3 are set similarly to the first embodiment.

Further, the above-described first sun gear S1, second sun gear S2 and third sun gear S3 are in mesh with the first to third pinion gears P1, P2 and P3, respectively. The first to third sun gears S1 to S3 have pitch circle diameters different from each other. The first sun gear S1 is integrally attached to the right output shaft SRR, and the second sun gear S2 is integrally attached to the left output shaft SRL. The third sun gear S3 is integrally attached to a rotating shaft 15. The rotating shaft 15 is rotatably supported by a bearing (not shown), and the left output shaft SRL is relatively rotatably disposed inside the rotating shaft 15. The first to third sun gear tooth numbers ZS1 to ZS3 (the numbers of the gear teeth of the first to third sun gears S1 to S3) are set similarly to the first embodiment.

Similarly to the first motor 113 described in the first embodiment, the first rotating electric machine 11 is an AC motor, and includes a first stator 11a formed e.g. by a plurality of iron cores and coils, and a first rotor 11b formed e.g. by a plurality of magnets. The first stator 11a is fixed to the immovable casing CA. The first rotor 11b is disposed in a manner opposed to the first stator 11a, and is integrally attached to the above-mentioned rotating shaft 15 such that it is rotatable together with the rotating shaft 15 and the third sun gear S3. In the first rotating electric machine 11, when electric power is supplied to the first stator 11a, the supplied electric power is converted to motive power, and is output to the first rotor 11b (powering). Further, when the motive power is input to the first rotor 11b, this motive power is converted to electric power, and is output to the first stator 11a (regeneration).

Further, the first stator 11a is electrically connected to the battery 23 via the first PDU 21 described in the first embodiment, and is capable of supplying and receiving electric energy to and from the battery 23. The ECU 2 described in the first embodiment (see FIG. 2) controls the first PDU 21 to thereby control electric power supplied to the first stator 11a, electric power generated by the first stator 11a, and the rotational speed of the first rotor 11b.

Similarly to the first rotating electric machine 11, the second rotating electric machine 12 as well is an AC motor, and includes a second stator 12a and a second rotor 12b. The second stator 12a and the second rotor 12b are constructed similarly to the first stator 11a and the first rotor 11b, respectively. Further, the second rotor 12b is integrally attached to the root portion 13a of the above-described carrier member 13, and is rotatable together with the carrier member 13. Furthermore, similarly to the first rotating electric machine 11, the second rotating electric machine 12 is capable of converting electric power supplied to the second stator 12a to motive power and outputting the motive power to the second rotor 12b, and is capable of converting the motive power input to the second rotor 12b to electric power and outputting the electric power to the second stator 12a.

Further, the second stator 12a is electrically connected to the battery 23 via the second PDU 22 described in the first embodiment, and is capable of supplying and receiving electric energy to and from the battery 23. The ECU 2 controls the second PDU 22 to thereby control electric power supplied to the second stator 12a, electric power generated by the second stator 12a, and the rotational speed of the second rotor 12b.

Hereinafter, converting electric power supplied to the first stator 11a (second stator 12a) to motive power and outputting the motive power from the first rotor 11b (second rotor 12b) is referred to as "powering", as deemed appropriate. Further, generating electric power by the first stator 11a (second stator 12a) using motive power input to the first rotor 11b (second rotor 12b) to thereby convert the motive power to electric power is referred to as "regeneration", as deemed appropriate.

In the power plant 1 constructed as above, the first to third sun gears S1 to S3 are in mesh with the first to third pinion gears P1 to P3 of the triple pinion gears 14 rotatably supported by the carrier member 13, respectively, and the first to third pinion tooth numbers ZP1 to ZP3 and the first to third sun gear tooth numbers ZS1 to ZS3 are set as described hereinabove, so that the carrier member 13, and the first to third sun gears S1 to S3 can transmit motive power therebetween, and the rotational speeds thereof are in a collinear relationship. Here, the term "collinear relationship" refers to a relationship in which the rotational speeds are on the same straight line in a collinear chart. Further, when the triple pinion gears 14 are rotated in a state in which the carrier member 13 is fixed, all of the first to third sun gears S1 to S3 rotate in a direction opposite to the direction of rotation of the triple pinion gears 14. The rotational speed of the third sun gear S3 becomes higher than that of the second sun gear S2, and the rotational speed of the second sun gear S2 becomes higher than that of the first sun gear S1. Therefore, in the collinear chart, the third to first sun gears S3 to S1 and the carrier member 13 are sequentially aligned in the mentioned order.

Further, the first rotor 11b and the third sun gear S3 are connected to each other via the rotating shaft 15. Therefore, the rotational speeds of the first rotor 11b and the third sun gear S3 are equal to each other. Furthermore, since the second sun gear S2 is directly connected to the left output shaft SRL, the rotational speeds of the two S1 and SRL are equal to each other, and since the first sun gear S1 is directly connected to the right output shaft SRR, the rotational speeds of S1 and SRR are equal to each other. Further, since the carrier member 13 and the second rotor 12b are directly connected to each other, the rotational speeds of 13 and 12b are equal to each other.

Figure 11:
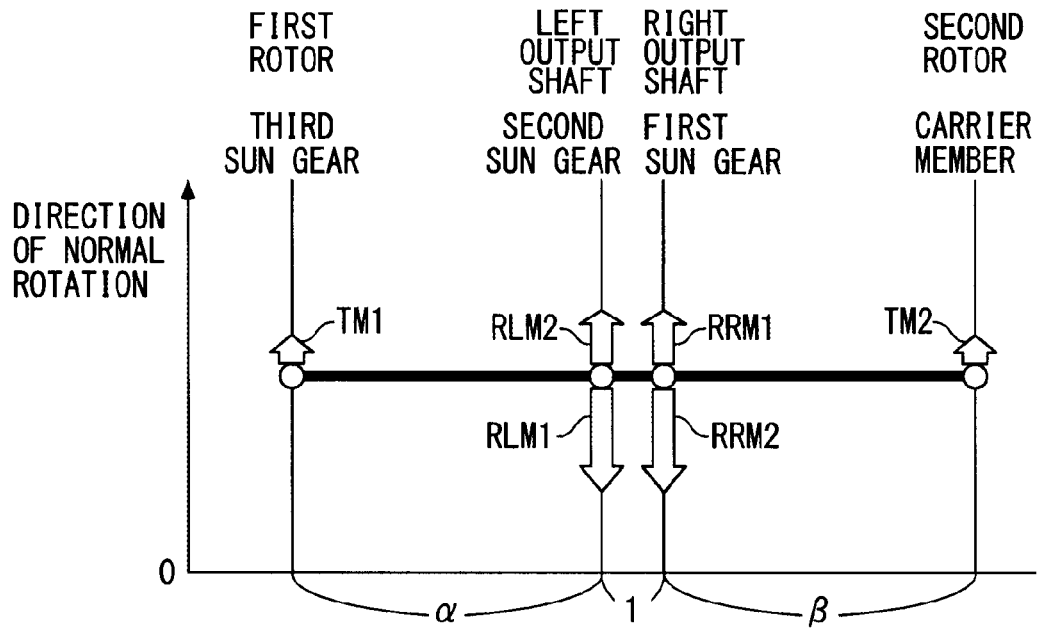
FIG. 11 A collinear chart showing a rotational speed relationship and a torque balance relationship between various types of rotary elements of the power plant shown in FIG. 10, in a traveling state of the vehicle during straight forward traveling thereof and at the same time other than deceleration traveling thereof.

From the above, the relationship between the rotational speeds of the third to first sun gears S3 to S1, the carrier member 13, the left and right output shafts SRL and SRR, the first and second rotors 11b and 12b is expressed as in a collinear chart shown in FIG. 11. As is apparent from FIG. 11, the left and right output shafts SRL and SRR can be differentially rotated with each other.

In FIG. 11, α and β represent a first lever ratio and a second lever ratio, and are expressed by the following equations (3) and (4):

$$\alpha = \{1-(ZP2/ZS2)\times(ZS3/ZP3)\}/\{(ZP2/ZS2)\times(ZS3/ZP3)-(ZP1/ZS1)\times(ZS3/ZP3)\} \quad (3)$$

$$\beta = (ZP1\times ZS2)/(ZS1\times ZP2 - ZP1\times ZS2) \quad (4)$$

The power plant 1 is equipped with a differential limiting mechanism 16 for limiting a differential rotation between the left and right output shafts SRL and SRR. The differential limiting mechanism 16 is formed by a hydraulic friction clutch, and includes an inner 16a and an outer 16b each having an annular plate shape. The inner 16a and the outer 16b are arranged coaxially with the carrier member 13 and the first to third sun gears S1 to S3. The inner 16a is integrally attached to the above-described rotating shaft 15, and the outer 16b is integrally attached to the four support shafts 13b of the carrier member 13. The degree of engagement of the differential limiting mechanism 16 is controlled by the ECU 2, whereby the rotating shaft 15 and the carrier member 13, i.e. the third sun gear S3 and the carrier member 13 are connected to and disconnected from each other.

Further, the ECU 2 controls the differential limiting mechanism 16 and the first and second rotating electric machines 11 and 12 based on the detection signals from the aforementioned sensors 31 to 34, according to control programs stored in the ROM. With this control, various operations of the power plant 1 are performed. Hereafter, a description will be given of the operations of the power plant 1 during straight forward traveling and during left and right turning of the vehicle.

[During Straight Forward Traveling]

During straight and constant-speed traveling or straight and accelerating traveling of the vehicle, powering is performed by both the first and second rotating electric machines 11 and 12, and electric power supplied from the battery 23 to the first and second stators 11a and 12a is controlled. FIG. 11 shows a rotational speed relationship and a torque balance relationship between various types of rotary elements in this case. In the figure, TM1 and TM2 represent output torques generated by the first and second rotors 11b and 12b along with the powering by the first and second rotating electric machines 11 and 12 (hereinafter referred to as the "first motor output torque" and the "second motor output torque"), respectively. Further, RLM1 and RRM1 represent reaction force torques acting on the left output shaft SRL and the right output shaft SRR along with the powering by the first rotating electric machine 11, respectively, and RLM2 and RRM2 represent reaction force torques acting on the left output shaft SRL and the right output shaft SRR along with the powering by the second rotating electric machine 12, respectively.

In this case, torque transmitted to the left output shaft SRL (hereinafter referred to as the "left output shaft-transmitted torque") is expressed by RLM1−RLM2 (RLM1>RLM2), and torque transmitted to the right output shaft SRR (hereinafter referred to as the "right output shaft-transmitted torque") is expressed by RRM2−RRM1 (RRM2>RRM1). The left and right output shafts SRL and SRR are driven in the direction of normal rotation together with the left and right rear wheels WRL and WRR. Further, electric power supplied to the first and second stators 11a and 12a are controlled such that the left output shaft-transmitted torque and the right output shaft-transmitted torque become the same demanded torque. This demanded torque is calculated by searching a predetermined map (not shown) according to the detected accelerator pedal opening AP. Furthermore, as an execution condition for executing the above-described powering by the first and second rotating electric machines 11 and 12, there is employed e.g. a condition that the engine is being assisted by the first and second rotating electric machines 11 and 12 (hereinafter referred to as "during the motor assist"), or a condition that the vehicle is being driven only by the first and second rotating electric machines 11 and 12 without using the engine (hereinafter referred to as "during the EV traveling") and at the same time a calculated state of charge of the battery 23 is higher than a lower limit value. In this case, the fact that the state of charge of the battery 23 is higher than the lower limit value indicates that the battery 23 is capable of being discharged.

Figure 12:
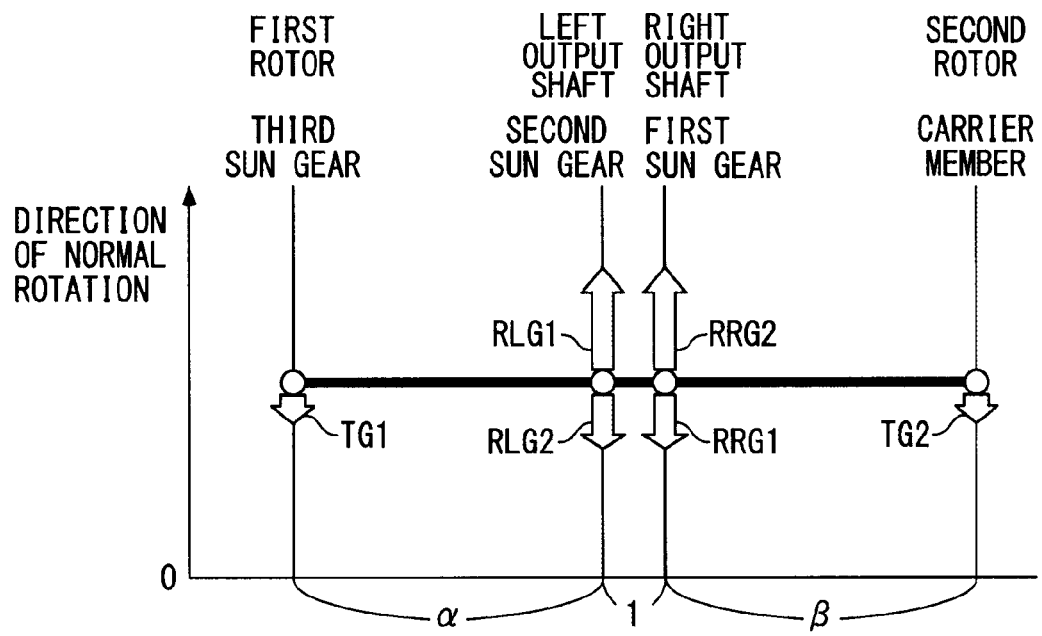
FIG. 12 A collinear chart showing the rotational speed relationship and a torque balance relationship between various types of rotary elements of the power plant shown in FIG. 10, during straight forward traveling of the vehicle and at the same time during deceleration traveling of the same.

Further, during straight forward traveling and decelerating traveling of the vehicle, regeneration is performed by both the first and second rotating electric machines 11 and 12, and regenerated electric power is charged into the battery 23 and is controlled. FIG. 12 shows a rotational speed relationship and a torque balance relationship between the various types of rotary elements in this case. In the figure, TG1 and TG2 represent braking torques generated by the first and second rotors 11b and 12b along with the regeneration by the first and second rotating electric machines 11 and 12 (hereinafter referred to as the "first motor braking torque" and the "second motor braking torque"), respectively. Further, RLG1 and RRG1 represent reaction force torques acting on the left output shaft SRL and the right output shaft SRR along with the regeneration by the first rotating electric machine 11, and RLG2 and RRG2 represent reaction force torques acting on the left output shaft SRL and the right output shaft SRR along with the regeneration by the second rotating electric machine 12.

In this case, the left output shaft-transmitted torque is expressed by −RLG1+RLG2 (RLG1>RLG2), and the right output shaft-transmitted torque is expressed by −RRG2+ RRG1 (RRG2>RRG1). The braking torque acts on the left and right output shafts SRL and SRR, and the vehicle is decelerated. Further, the electric power regenerated by the first and second rotating electric machines 11 and 12 is controlled such that the same braking torque acts on the left and right output shafts SRL and SRR. Furthermore, e.g. a condition that the state of charge of the battery 23 is lower than an upper limit value is used as an execution condition for executing the above-described regeneration by the first and second rotating electric machines 11 and 12. In this case, the fact that the state of charge of the battery 23 is lower than the upper limit value indicates that the battery 23 is capable of being charged.

[During Right Turning]

During right turning of the vehicle, when a clockwise yaw moment for causing the vehicle to perform right turning is increased, yaw moment-increasing control for right turning is executed. First yaw moment-increasing control to fourth yaw moment-increasing control are provided for the yaw moment-increasing control. Hereinafter, a description will be sequentially given of the first yaw moment-increasing control to fourth yaw moment-increasing control. First, during the first yaw moment-increasing control, powering is performed by both the first and second rotating electric machines 11 and 12, and the electric power supplied to the first and second stators 11a and 12a is controlled such that the first motor output torque TM1 becomes larger than the second motor output torque TM2.

With this control, as is apparent from the above-described torque balance relationship shown in FIG. 11, the left output shaft-transmitted torque becomes larger than the right output shaft-transmitted torque, whereby the clockwise yaw moment of the vehicle is increased. In this case, the electric power supplied to the first and second stators 11a and 12a is controlled according to the detected steering angle θ, vehicle speed VP, and accelerator pedal opening AP. Note that as an execution condition for executing the first yaw moment-increasing control, there is employed e.g. a condition that it is during the motor assist (the engine is being assisted by the first and second rotating electric machines 11 and 12) or a condition that it is during the EV traveling (the vehicle is being driven only by the first and second rotating electric machines 11 and 12) and at the same time the state of charge of the battery 23 is higher than the lower limit value.

During the second yaw moment-increasing control, regeneration is performed by both the first and second rotating electric machines 11 and 12, and the electric power regenerated by the first and second rotating electric machines 11 and 12 is controlled such that the second motor braking torque TG2 becomes larger than the first motor braking torque TG1.

With this control, as is apparent from the above-described torque balance relationship shown in FIG. 12, the braking torque acting on the right output shaft SRR becomes larger than the braking torque acting on the left output shaft SRL, so that the clockwise yaw moment of the vehicle is increased. In this case, the electric power regenerated by the first and second rotating electric machines 11 and 12 is controlled according to the steering angle θ, the vehicle speed VP, and so forth. Note that as an execution condition for executing the second yaw moment-increasing control, there is employed e.g. a condition that it is during deceleration traveling of the vehicle and at the same time the state of charge of the battery 23 is smaller than the upper limit value.

Figure 13:
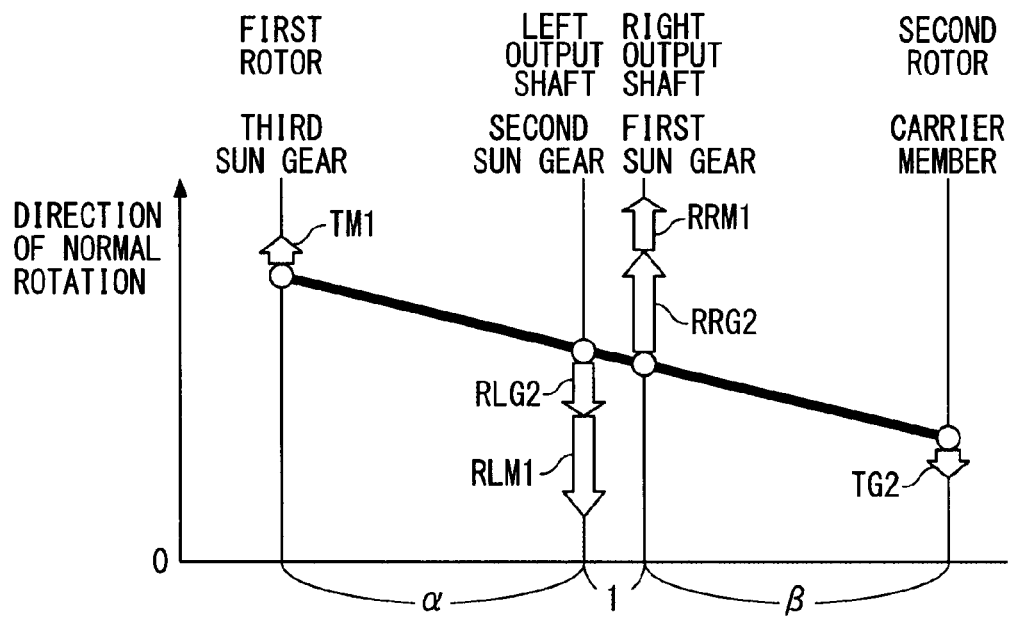
FIG. 13 A collinear chart showing the rotational speed relationship and a torque balance relationship between various types of rotary elements of the power plant shown in FIG. 10, during increasing control of a third yaw moment for right turning.

During the third yaw moment-increasing control, powering is performed by the first rotating electric machine 11, and regeneration is performed by the second rotating electric machine 12. FIG. 13 shows a rotational speed relationship and a torque balance relationship between the various types of rotary elements in this case. As described above with reference to FIG. 11, in FIG. 13, TM1 represents the first motor output torque, and RLM1 and RRM1 represent the reaction force torques acting on the left output shaft SRL and the right output shaft SRR along with the powering by the first rotating electric machine 11, respectively. Further, as described above with reference to FIG. 12, in FIG. 13, TG2 represents the second motor braking torque, and RLG2 and RRG2 represent the reaction force torques acting on the left output shaft SRL and the right output shaft SRR along with the regeneration by the second rotating electric machine 12.

In this case, the left output shaft-transmitted torque is expressed by RLM1+RLG2, and the right output shaft-transmitted torque is expressed by −(RRM1+RRG2). As described above, the left output shaft-transmitted torque is increased, and the braking torque acts on the right output shaft SRR, so that the clockwise yaw moment of the vehicle is increased. In this case as well, electric power supplied to the first stator 11a and electric power regenerated by the second rotating electric machine 12 are controlled according to the steering angle θ, the vehicle speed VP, and the accelerator pedal opening AP.

Note that as an execution condition for executing the second yaw moment-increasing control, there is employed the following first increasing condition or second increasing condition:

The first increasing condition: The vehicle is being driven by the engine, and at the same time the state of charge of the battery 23 is not lower than an upper limit value.

The second increasing condition: The vehicle is being driven by the engine, the state of charge of the battery 23 is lower than the upper limit value, and at the same time braking torque demanded of the second rotating electric machine 12 is not smaller than a predetermined first upper limit torque.

In this case, when the first increasing condition is satisfied, i.e. when the state of charge of the battery 23 is not lower than the upper limit value, the battery 23 cannot be charged, and hence all the electric power regenerated by the second rotating electric machine 12 is supplied to the first stator 11a without being charged into the battery 23. On the other hand, when the second increasing condition is satisfied, part of the electric power regenerated by the second rotating electric machine 12 is charged into the battery 23, and the remainder is supplied to the first stator 11a. In this case, the first motor output torque TM1 is controlled such that an insufficient amount of the second motor braking torque TG2 with respect to the demanded braking torque is compensated for.

During the fourth yaw moment-increasing control, the zero torque control is performed on the first rotating electric machine 11, and regeneration is performed by the second rotating electric machine 12 to change regenerated electric power into the battery 23. The zero torque control prevents dragging losses from being caused by regeneration by the first rotating electric machine 11. In this case, only the second motor braking torque TG2 is generated, so that as is apparent from FIG. 13, the left output shaft-transmitted torque is represented by RLG2, and the right output shaft-transmitted torque is represented by −RRG2. As described above, the left output shaft-transmitted torque is increased, and the braking torque acts on the right output shaft SRR, so that the clockwise yaw moment of the vehicle is increased. In other words, part of the torque of the right output shaft SRR is transmitted to the left output shaft SRL using the second motor braking torque TG2 as a reaction force. In this case as well, the electric power regenerated by the second rotating electric machine 12 is controlled according to the steering angle θ, the vehicle speed VP, and the accelerator pedal opening AP. Note that as an execution condition for executing the fourth yaw moment-increasing control, there is employed e.g. a condition that the vehicle is being driven by the engine, the state of charge of the battery 23 is lower than the upper limit value, and at the same time the braking torque demanded of the second rotating electric machine 12 is smaller than the above-mentioned first upper limit torque.

During the right turning of the vehicle, when the clockwise yaw moment for causing the vehicle to perform right turning is reduced, yaw moment-reducing control for right turning is executed. First yaw moment-reducing control to fourth yaw moment-reducing control are provided for the yaw moment-reducing control. Hereinafter, a description will be sequentially given of the first yaw moment-increasing control to fourth yaw moment-reducing control. First, during the first yaw moment-reducing control, powering is performed by both the first and second rotating electric machines 11 and 12, and electric power supplied to the first and second stators 11a and 12a is controlled such that the second motor output torque TM2 becomes larger than the first motor output torque TM1.

With this control, as is apparent from the above-described torque balance relationship shown in FIG. 11, the right output shaft-transmitted torque becomes larger than the left output shaft-transmitted torque, so that the clockwise yaw moment of the vehicle is reduced. In this case, the electric power supplied to the first and second stators 11a and 12a is controlled according to the steering angle θ, the vehicle speed VP, and the accelerator pedal opening AP. Note that as an execution condition for executing the first yaw moment-reducing control, there is employed e.g. a condition that it is during the motor assist or during the EV traveling, and at the same time the state of charge of the battery 23 is higher than the lower limit value.

During the second yaw moment-reducing control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the first motor braking torque TG1 becomes larger than the second motor braking torque TG2.

With this control, as is apparent from the above-described torque balance relationship shown in FIG. 12, the braking torque acting on the left output shaft SRL becomes larger than the braking torque acting on the right output shaft SRR, so that the clockwise yaw moment of the vehicle is reduced. In this case, the electric power regenerated by the first and second rotating electric machines 11 and 12 is controlled according to the steering angle θ and the vehicle speed VP. Note that as an execution condition for executing the second yaw moment-reducing control, there is employed e.g. a condition that it is during deceleration traveling of the vehicle, and at the same time the state of charge of the battery 23 is lower than the upper limit value are used.

Figure 14:
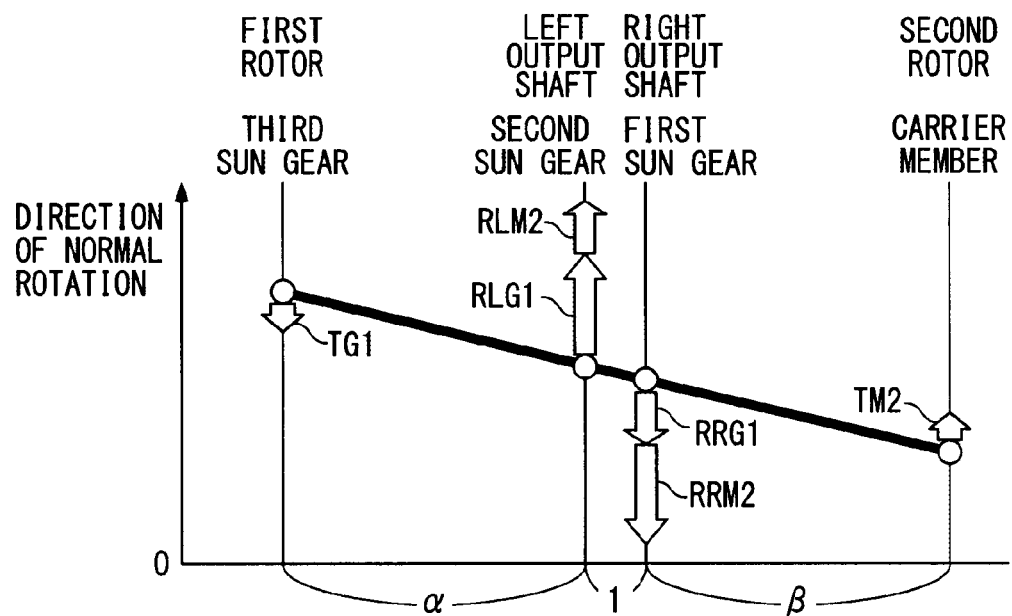
FIG. 14 A collinear chart showing the rotational speed relationship and a torque balance relationship between various types of rotary elements of the power plant shown in FIG. 10, during reducing control of the third yaw moment for right turning.

During the third yaw moment-reducing control, regeneration is performed by the first rotating electric machine 11, and powering is performed by the second rotating electric machine 12. FIG. 14 shows a rotational speed relationship and a torque balance relationship between the various types of rotary elements in this case. As described above with reference to FIG. 12, in FIG. 14, TG1 represents the first motor braking torque, and RLG1 and RRG1 represent the reaction force torques acting on the left output shaft SRL and the right output shaft SRR along with the regeneration by the first rotating electric machine 11, respectively. Further, as described above with reference to FIG. 11, in FIG. 14, TM2 represents the second motor output torque, and RLM2 and RRM2 represent the reaction force torques acting on the left output shaft SRL and the right output shaft SRR along with the powering by the second rotating electric machine 12.

In this case, the left output shaft-transmitted torque is expressed by −(RLG1+RLM2), and the right output shaft-transmitted torque is expressed by RRG1+RRM2. As described above, the braking torque acts on the left output shaft SRL, and the right output shaft-transmitted torque is increased, so that the clockwise yaw moment of the vehicle is reduced. In this case as well, electric power regenerated by the first rotating electric machine 11 and electric power supplied to the second stator 12a are controlled according to the steering angle θ and the vehicle speed VP.

Note that as an execution condition for executing the third yaw moment-reducing control, there is employed the following first reducing condition or second reducing condition:

The first reducing condition: It is during deceleration traveling of the vehicle, and at the same time the state of charge of the battery 23 is not lower than the upper limit value.

The second reducing condition: It is during deceleration traveling of the vehicle, the state of charge of the battery 23 is lower than the upper limit value, and at the same time braking torque demanded of the first rotating electric machine 11 is not lower than a predetermined second upper limit torque.

In this case, when the first reducing condition is satisfied, i.e. when the state of charge of the battery 23 is not lower than the upper limit value, the battery 23 cannot be charged, and hence all the electric power regenerated by the first rotating electric machine 11 is supplied to the second stator 12a without being charged into the battery 23. On the other hand, when the second reducing condition is satisfied, part of the electric power regenerated by the first rotating electric machine 11 is charged into the battery 23, and the remainder is supplied to the second stator 12a. In this case, the second motor output torque TM2 is controlled such that an insufficient amount of the first motor braking torque TG1 with respect to the demanded braking torque is compensated for.

During the fourth yaw moment-reducing control, regeneration is performed by the first rotating electric machine 11, and the zero torque control is performed on the second rotating electric machine 12. In this case, only the first motor braking torque TG1 is generated, so that as is apparent from FIG. 14, the left output shaft-transmitted torque is represented by −RLG1, and the right output shaft-transmitted torque is represented by RRG1. As described above, the braking torque acts on the left output shaft SRL, and the right output shaft-transmitted torque is increased, so that the clockwise yaw moment of the vehicle is reduced. In other words, part of the torque of the left output shaft SRL is transmitted to the right output shaft SRR using the first motor braking torque TG1 as a reaction force. In this case as well, the electric power regenerated by the first rotating electric machine 11 is controlled according to the steering angle θ and the vehicle speed VP. Note that as an execution condition for executing the fourth yaw moment-reducing control, there is employed e.g. a condition that it is during deceleration traveling of the vehicle, the state of charge of the battery 23 is lower than the upper limit value, and at the same time the braking torque demanded of the first rotating electric machine 11 is smaller than the above-mentioned second upper limit torque.

Note that during the left turning of the vehicle, when a counterclockwise yaw moment for causing the vehicle to perform left turning is increased, yaw moment-increasing control for left turning is executed, whereas when the counterclockwise yaw moment is reduced, yaw moment-reducing control for left turning is executed. The above-described yaw moment-increasing control and yaw moment-reducing control for left turning are executed substantially similarly to the yaw moment-increasing control and yaw moment-reducing control for right turning, respectively, and detailed description thereof is omitted.

During straight forward traveling and left and right turning of the vehicle, basically, the above-described differential limiting mechanism 16 holds the third sun gear S3 and the carrier member 13 in a disconnected state. With this configuration, as is apparent from the collinear chart shown in FIG. 11, the third sun gear S3 and the carrier member 13 are differentially rotatably held with respect to each other within a range where the third sun gear S3 and the carrier member 13 satisfy a collinear relationship shown in the figure, and similarly, the left and right output shafts SRL and SRR are also differentially rotatably held.

On the other hand, for example, during rapid turning or high-speed straight forward traveling of the vehicle, with a view to enhancing the stability of the behavior of the vehicle, to limit the differential rotation between the left and right output shafts SRL and SRR, the differential limiting mechanism 16 is controlled such that the third sun gear S3 and the carrier member 13 are connected to each other. As shown in FIG. 11 and the like, the rotational speeds of the third to first sun gears S3 to S1 and the carrier member 13 are in the collinear relationship, and hence reaction force torques, which act on the third sun gear S3 and the carrier member 13 from the differential limiting mechanism 16 along with connection by the differential limiting mechanism 16, act such that the third to first sun gears S3 to S1 and the carrier member 13 are caused to rotate in unison with each other, and act on the left and right output shafts SRL and SRR such that the differential rotation therebetween is limited. As a consequence, since the differential rotation between the left and right output shafts SRL and SRR is limited, oversteer is suppressed during the rapid turning of the vehicle, and the straight forward traveling properties of the behavior of the vehicle are enhanced during the high-speed straight forward traveling thereof, thereby the stability of the behavior of the vehicle is increased.

Figure 23:
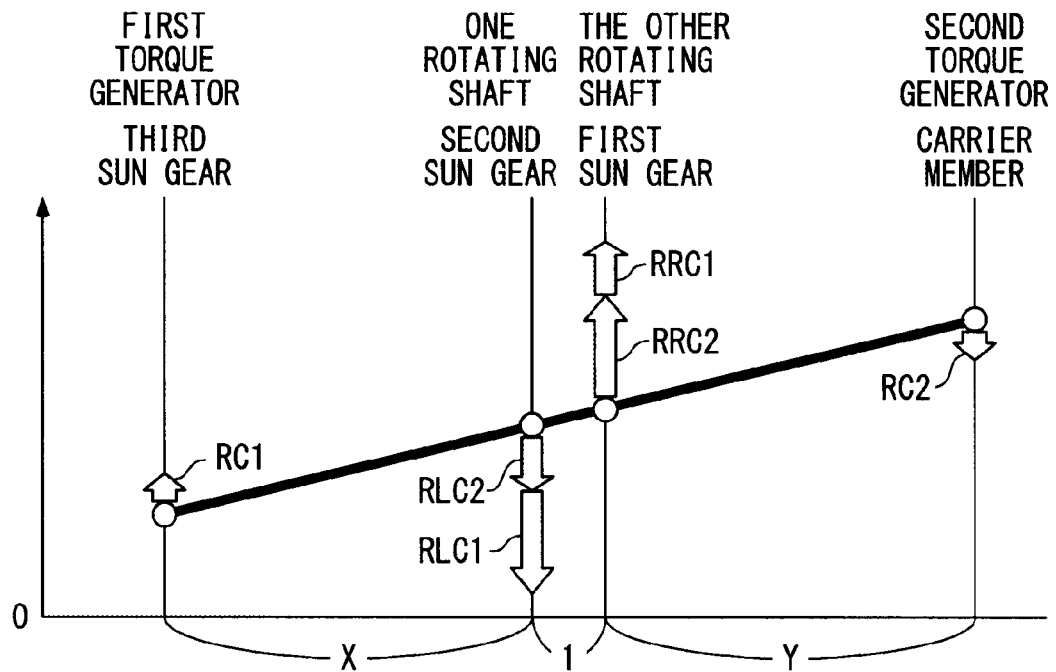
FIG. 23 A collinear chart illustrating an example of rotational speed relationship and a torque balance relationship between various types of rotary elements in the present invention.
Figure 24:
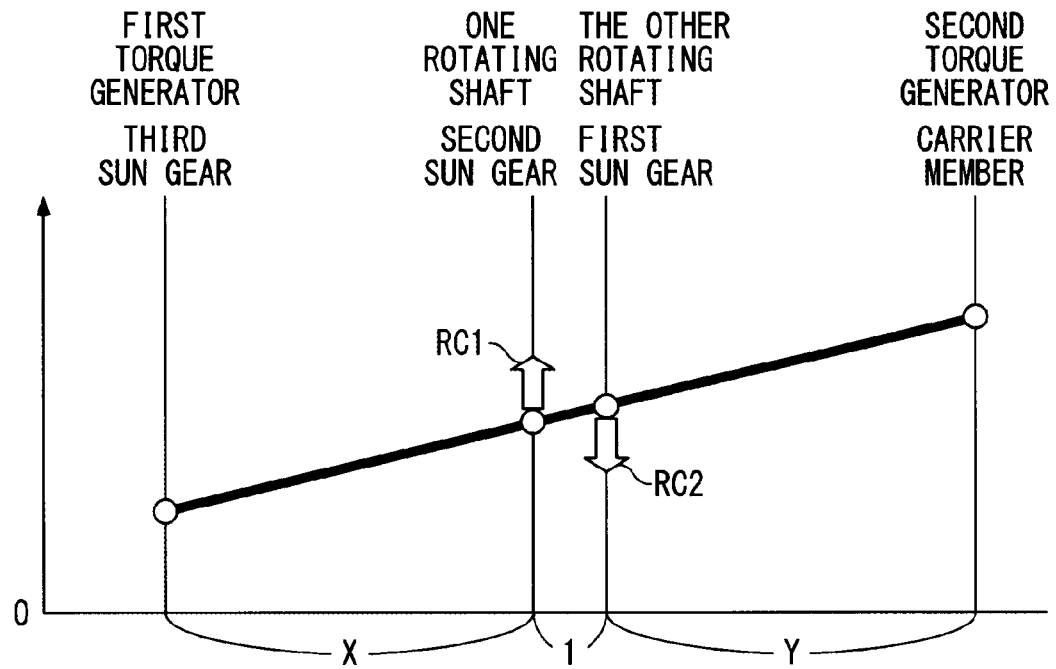
FIG. 24 A collinear chart illustrating an example of a rotational speed relationship and a torque balance relationship between various types of rotary elements in a comparative example compared with the present invention.
Figure 25:
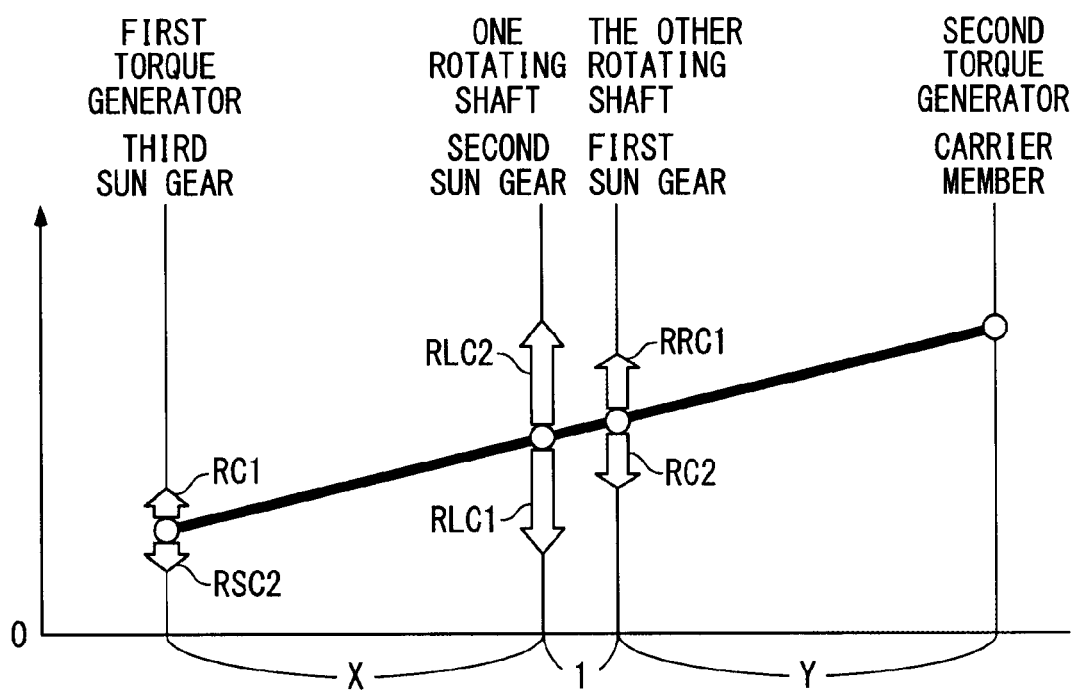
FIG. 25 A collinear chart illustrating an example of a rotational speed relationship and a torque balance relationship between various types of rotary elements in a comparative example other than the comparative example shown in FIG. 24.

In this case, as is apparent from the description of the present invention with reference to FIG. 23, as the reaction force torques acting on the third sun gear S3 and the carrier member 13 from the differential limiting mechanism 16 are larger, the sum total of the differential limiting torques, which act on the left and right output shafts SRL and SRR such that the differential rotation between the left and right output shafts SRL and SRR is limited (hereinafter referred to as the "total differential limiting torque") becomes larger. Therefore, by adjusting the reaction force torques of the differential limiting mechanism 16 through controlling the degree of engagement of the differential limiting mechanism 16, it is possible to control the total differential limiting torque, and hence it is possible to control the degree of limiting the differential rotation between the left and right output shafts SRL and SRR.

Further, the correspondence between various elements of the fourth embodiment and various elements of the invention is as follows: The left and right output shafts SRL and SRR in the fourth embodiment correspond to one and the other of the two rotating shafts in the present invention, respectively, and the first and second rotating electric machines 11 and 12 in the fourth embodiment correspond to the first and second torque generators in the present invention, respectively. Further, the third to first sun gears S3 to S1 and the carrier member 13 in the fourth embodiment correspond to first to fourth elements of the gear unit in the present invention, respectively. Furthermore, the first and second motor torques TM1 and TM2 in the fourth embodiment correspond to positive torques in the present invention, and the first and second motor braking torques TG1 and TG2 correspond to negative torques in the present invention.

As described hereinabove, according to the fourth embodiment, the triple pinion gears 14 are rotatably supported by the rotatable carrier member 13, and the rotatable first to third sun gears S1 to S3 are in mesh with the first to third pinion gears P1 to P3 which are integrally formed with each other to form the triple pinion gears 14, respectively. Further, the rotational speeds of the third to first sun gears S3 to S1 and the carrier member 13 are in the collinear relationship, and are sequentially aligned in the collinear chart in the mentioned order (see e.g. FIG. 11).

Furthermore, the third sun gear S3 is connected to the first rotating electric machine 11, and the second and first sun gears S2 and S1 are connected to the left and right output shafts SRL and SRR, respectively. The carrier member 13 is connected to the second rotating electric machine 12. From the above, it is possible to transmit the first and second motor output torques TM1 and TM2, and the first and second motor braking torques TG1 and TG2 to the left and right output shafts SRL and SRR via the third to first sun gears S3 to S1 and the carrier member 13, to thereby properly drive the left and right output shafts SRL and SRR. In this case, the rotational speeds of the third to first sun gears S3 to S1 and the carrier member 13 are in the collinear relationship, so that as described with reference to FIGS. 11 to 14, by controlling the first and second motor output torques TM1 and TM2, and the first and second motor braking torques TG1 and TG2, it is possible to properly control torque distributed to the left and right output shafts SRL and SRR.

Further, differently from the above-described conventional case, to control the torque distributed to the left and right output shafts SRL and SRR, instead of the speed-increasing and speed-reducing clutches formed by wet friction clutches, the first and second rotating electric machines 11 and 12 are used, so that occurrence of large dragging losses can be prevented by the aforementioned zero torque control, and hence it is possible to suppress loss. In addition to this, it is possible to dispense with a hydraulic pump for supplying oil pressure to the speed-increasing and speed-reducing clutches. Furthermore, it is also possible to dispense with a spool valve for actuating the speed-increasing and speed-reducing clutches, a solenoid, a strainer, and so forth, which makes it possible to downsize the power plant 1 and enhance mountability thereof.

Furthermore, out of the third to first sun gears S3 to S1 and the carrier member 13, the rotational speeds of which are in the collinear relationship, the third sun gear S3 and the carrier member 13 are connected to and disconnected from each other by the differential limiting mechanism 16. This causes the third to first sun gears S3 to S1 and the carrier member 13 to rotate in unison with each other, so that it is possible to limit the differential rotation between the left output shaft SRL to which the second sun gear S2 is connected, and the right output shaft SRR to which the first sun gear S1 is connected, thereby making it possible to enhance the stability of the behavior of the vehicle. In this case, it is only required to simply connect the differential limiting mechanism 16, which makes it possible to easily limit the differential rotation between the left and right output shafts SRL and SRR, whereby it is possible to obtain high responsiveness of the differential limiting mechanism 16.

Further, out of the third to first sun gears S3 to S1 and the carrier member 13, the third sun gear S3 and the carrier member 13, which are positioned at opposite ends of the collinear chart, are connected to each other, so that it is possible to obtain the largest total differential limiting torque. This makes it possible to reduce reaction force torque which is required of the differential limiting mechanism 16 so as to limit the differential rotation between the left and right output shafts SRL and SRR, and hence it is possible to downsize the differential limiting mechanism 16, thereby making it possible to further downsize the power plant 1 and enhance the mountability thereof.

Further, to form four rotary elements of which the rotational speeds are in the collinear relationship, the gear unit GS is used which comprises the carrier member 13, the triple pinion gears 14, and the first to third sun gears S1 to S3. For this reason, to form the above four rotary elements, for example, compared with a case where the gear unit is constructed by a combination of two planetary gear units each of a single pinion type, it is possible to reduce the number of component parts, and reduce the radial size of the gear unit GS since the gear unit GS includes no ring gear.

Furthermore, since the first and second rotating electric machines 11 and 12 are used, it is possible to construct the power plant 1 easily and more inexpensively without using a special device. Further, in the case where distribution of torque to the left and right output shafts SRL and SRR is controlled as described above, when the first and second motor braking torques TG1 and TG2 are generated, it is possible to convert motive power to electric power using the first and second rotating electric machines 11 and 12. Therefore, e.g. by supplying the electric power obtained by the conversion to a vehicle accessory, it is possible to reduce the operating load and operating frequency of a generator for charging the power source of the accessory.

Figure 15:
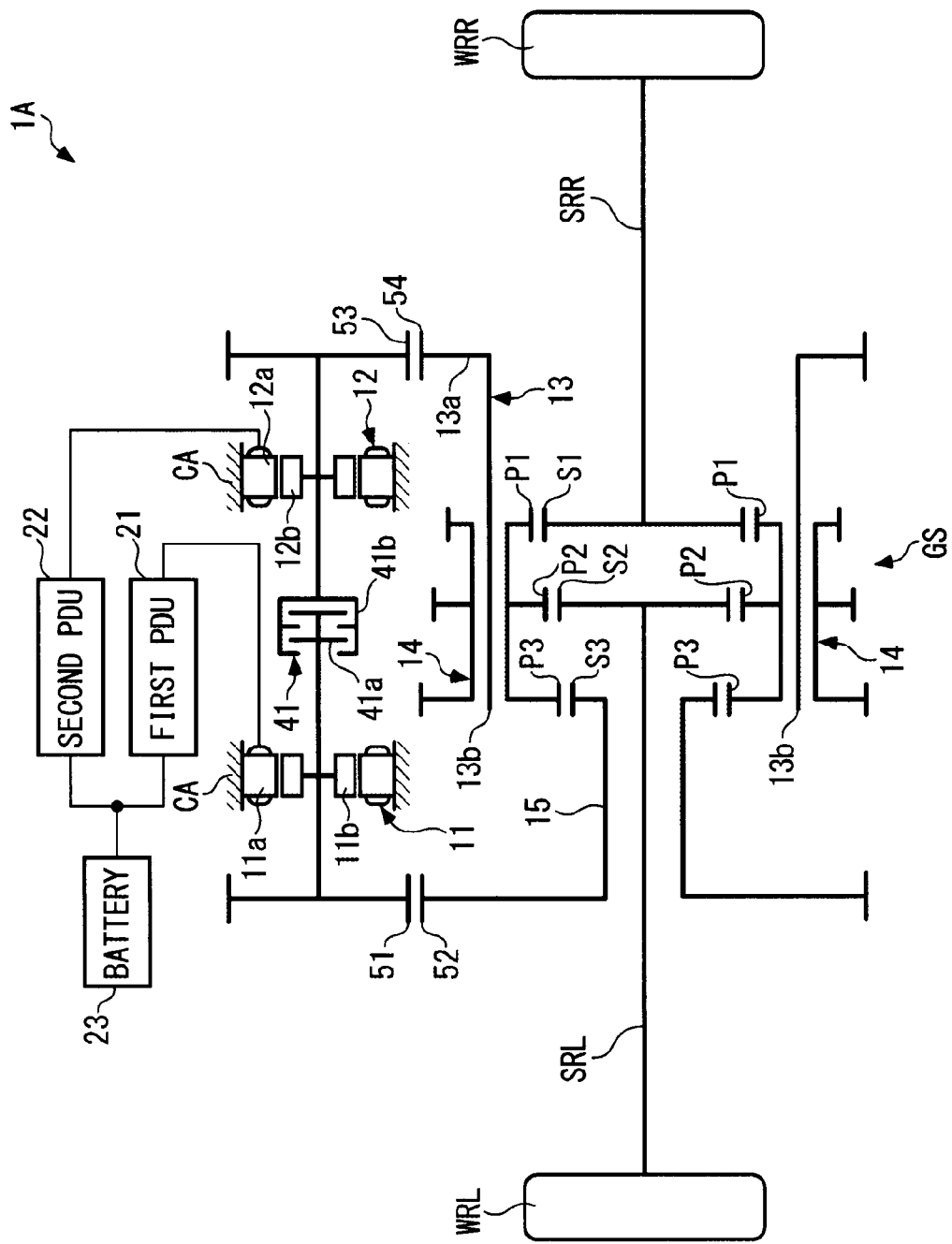
FIG. 15 A diagram schematically showing a power plant according to a fifth embodiment of the present invention together with left and right rear wheels of a vehicle to which the power plant is applied.

Next, a power plant 1A according to a fifth embodiment of the present invention will be described with reference to FIG. 15. The power plant 1A is distinguished from the fourth embodiment only in that reduction gears are provided in a power transmission path between the first rotor 11b and a differential limiting mechanism 41, and the third sun gear S3, and a power transmission path between the second rotor 12b and the differential limiting mechanism 41, and the carrier member 13, respectively. In FIG. 15, the same component elements as those of the fourth embodiment are denoted by the same reference numerals. The following description is mainly given of different points from the fourth embodiment.

The first rotor 11b is not attached to the above-described rotating shaft 15, but a gear 51 and a gear 52 are integrally attached to the first rotor 11b and the rotating shaft 15, respectively. These gears 51 and 52 are in mesh with each other. The number of the gear teeth of the gear 51 is set to a smaller value than that of the gear teeth of the gear 52. Motive power of the first rotating electric machine 11 is transmitted to the third sun gear S3 in a state reduced in speed by the gears 51 and 52. Further, the second rotor 12b is not attached to the carrier member 13 but a gear 53 and a gear 54 are integrally attached to the second rotor 12b and the root portion 13a of the carrier member 13, respectively. These gears 53 and 54 are in mesh with each other. The number of the gear teeth of the gear 53 is set to a smaller value than that of the gear teeth of the gear 54. Motive power of the second rotating electric machine 12 is transmitted to the carrier member 13 in a state reduced in speed by the gears 53 and 54. A gear ratio between the above-described gears 51 and 52, and a gear ratio between the gears 53 and 54 are set to the same value.

Similarly to the fourth embodiment, the differential limiting mechanism 41 is formed by a friction clutch, and includes an inner 41a and an outer 41b. Differently from the fourth embodiment, the inner 41a is integrally attached not to the rotating shaft 15 but to the first rotor 11b, and the outer 41b is integrally attached not to the four support shafts 13b of the carrier member 13 but to the second rotor 12b.

Further, the degree of engagement of the differential limiting mechanism 41 is controlled by the above-described ECU, whereby the first and second rotors 11b and 12b are connected to and disconnected from each other. In this case, as is apparent from the fact that the first rotor 11b is connected to the third sun gear S3 via the gear 51, the gear 52, and the rotating shaft 15, and the fact that the second rotor 12b is connected to the carrier member 13 via the gear 53 and the gear 54, the third sun gear S3 and the carrier member 13 are connected to and disconnected from each other by the differential limiting mechanism 41 as the first and second rotors 11b and 12b are connected to and disconnected from each other by differential limiting mechanism 41.

Further, the correspondence between various elements of the fifth embodiment and various elements of the invention is as follows: The gears 51 and 52 in the fifth embodiment correspond to a first power transmission mechanism in the present invention, and the gears 53 and 54 in the fifth embodiment correspond to a second power transmission mechanism in the present invention. The other correspondence is the same as in the fourth embodiment.

As described above, according to the fifth embodiment, the first rotating electric machine 11 is connected to the third sun gear S3 via a reduction gear comprising the gears 51 and 52, and the second rotating electric machine 12 is connected to the carrier member 13 via a reduction gear comprising the gears 53 and 54. This makes it possible to transmit the first and second motor output torques TM1 and TM2, and the first and second motor braking torques TG1 and TG2, in increased states, to the third sun gear S3 and the carrier member 13, respectively, so that it is possible to downsize the first and second rotating electric machines 11 and 12.

Further, similarly to the fourth embodiment, e.g. during rapid turning or high-speed straight forward traveling of the vehicle, to limit the differential rotation between the left and right output shafts SRL and SRR, the differential limiting mechanism 41 is controlled such that the third sun gear S3 and the carrier member 13 are connected to each other. Accordingly, reaction force torques from the differential limiting mechanism 41 act such that the third to first sun gears S3 to S1 and the carrier member 13 are caused to rotate in unison with each other, and act on the left and right output shafts SRL and SRR such that the differential rotation therebetween is limited. This makes it possible to limit the differential rotation between the left and right output shafts SRL and SRR, and in turn enhance the stability of the behavior of the vehicle. In this case as well, similarly to the fourth embodiment, by controlling the degree of engagement of the differential limiting mechanism 41, it is possible to control total differential limiting torque (the sum total of differential limiting torques acting to limit the differential rotation between the left and right output shafts SRL and SRR), and hence it is possible to control the degree of control of limiting the differential rotation between the left and right output shafts SRL and SRR.

Further, differently from the fourth embodiment, the differential limiting mechanism 41 is connected to the third sun gear S3 via the gears 51 and 52, and is connected to the carrier member 13 via the gears 53 and 54. As given in the description of the fourth embodiment, the total differential limiting torque becomes larger as the reaction force torques acting from the differential limiting mechanism 41 on the third sun gear S3 and the carrier member 13 are larger. According to the fifth embodiment, the reaction force torques from the differential limiting mechanism 41 can be transmitted to the third sun gear S3 and the carrier member 13, in increased states, by the gears 51 to 54, so that it is possible to reduce the reaction force torques required of the differential limiting mechanism 41 so as to limit the differential rotation between the left and right output shafts SRL and SRR, whereby it is possible to attain further downsizing of the differential limiting mechanism 41. In this case, a space necessary for arranging the gears 51 to 54 is smaller than a space reduced by downsizing the above-described differential limiting mechanism 41. Therefore, by downsizing the differential limiting mechanism 41, it is possible to further downsize the power plant 1A and enhance the mountability thereof. In addition to this, it is possible to obtain the same advantageous effects, such as suppression of loss, as provided by the fourth embodiment.

Figure 16:
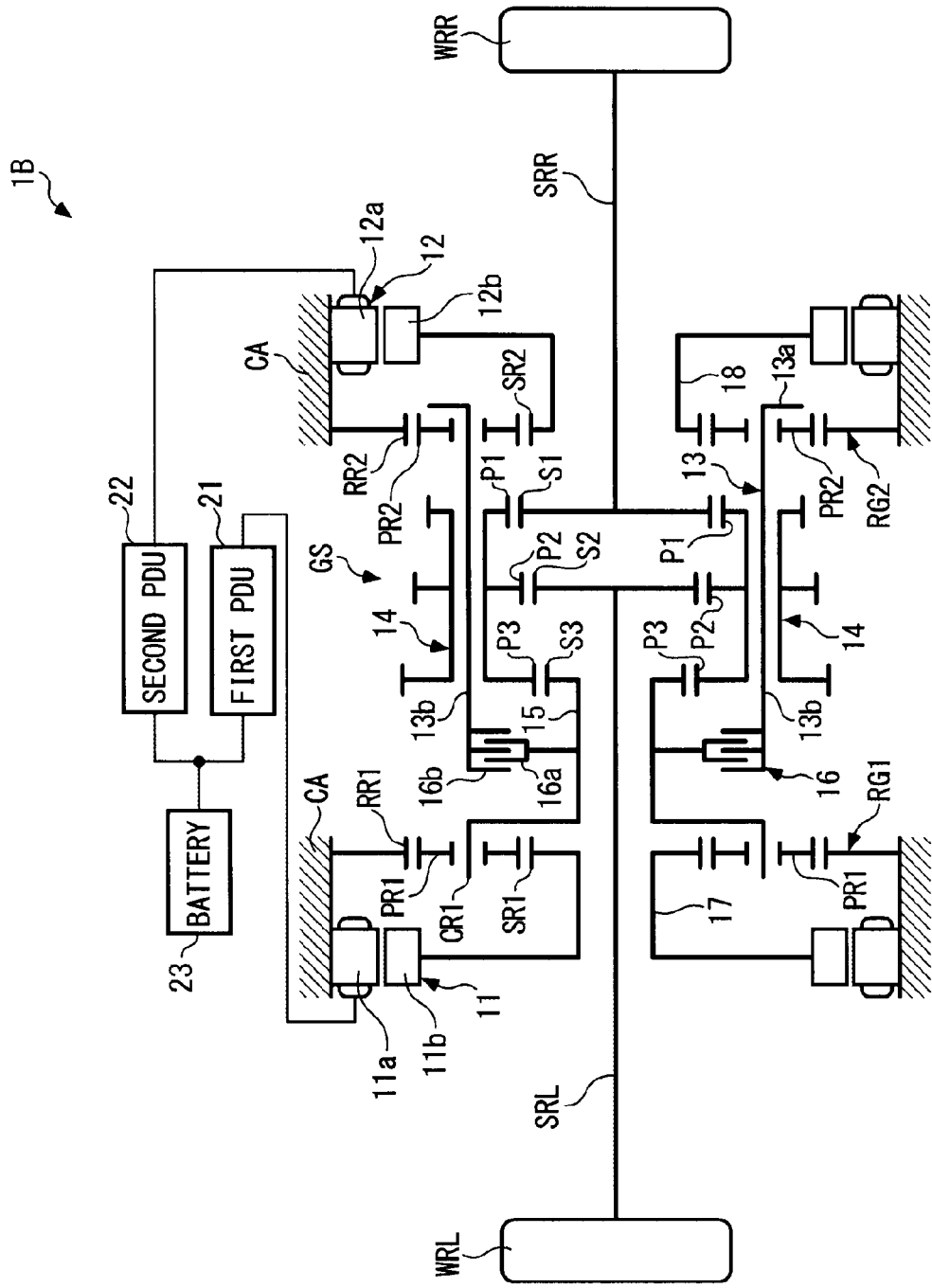
FIG. 16 A diagram schematically showing a power plant according to a sixth embodiment of the present invention together with left and right rear wheels of a vehicle to which the power plant is applied.

Next, a power plant 1B according to a sixth embodiment of the present invention will be described with reference to FIG. 16. This power plant 1B is distinguished from the fourth embodiment only in that the first reduction gear RG1 and the second reduction gear RG2 described in the third embodiment are provided in a power transmission path between the first rotor 11b and the third sun gear S3, and a power transmission path between the second rotor 12b and the carrier member 13, respectively. In FIG. 16, the same component elements as those of the third and fourth embodiments are denoted by the same reference numerals. The following description is mainly given of different points from the fourth embodiment.

The first sun gear SR1 of the first reduction gear RG1 is integrally attached to a hollow cylindrical rotating shaft 17. This rotating shaft 17 is rotatably supported by a bearing (not shown), and the left output shaft SRL is relatively rotatably disposed inside the rotating shaft 17. Further, the first rotor 11b is integrally attached not to the above-described rotating shaft 15 but to the rotating shaft 17, and is rotatable together with the rotating shaft 17 and the first sun gear SR1. Further, the first ring gear RR1 is fixed to the casing CA. The first carrier CR1 is integrally attached to the above-described rotating shaft 15, and is rotatable together with the rotating shaft 15 and the third sun gear S3. The motive power of the first rotating electric machine 11 is transmitted to the third sun gear SR3 in a state reduced in speed by the first reduction gear RG1 constructed as above.

The second sun gear SR2 of the above-described second reduction gear RG2 is integrally attached to a hollow cylindrical rotating shaft 18. This rotating shaft 18 is rotatably supported by a bearing (not shown), and the right output shaft SRR is relatively rotatably disposed inside the rotating shaft 18. Further, the second rotor 12b is integrally attached not to the carrier member 13 but to the rotating shaft 18, and is rotatable together with the rotating shaft 18 and the second sun gear SR2. Further, the second ring gear RR2 is fixed to the casing CA. The second pinion gears PR2 are equal in number (four, only two of which are shown) to the triple pinion gears 14, and are rotatably supported on the support shafts 13b of the carrier member 13. The motive power of the second rotating electric machine 12 is transmitted to the carrier member 13 in a state reduced in speed by the second reduction gear RG2 constructed as above.

As described hereinabove, in the sixth embodiment, the first rotating electric machine 11 is connected to the third sun gear S3 via the first reduction gear RG1, and the second rotating electric machine 12 is connected to the carrier member 13 via the second reduction gear RG2. This makes it possible, similarly to the fifth embodiment, to transmit the first and second motor output torques TM1 and TM2 and the first and second motor braking torques TG1 and TG2, in increased states, to the third sun gear S3 and the carrier member 13, respectively, so that it is possible to downsize the first and second rotating electric machines 11 and 12. In addition to this, it is possible to obtain the same advantageous effects as provided by the fourth embodiment.

Further, since the carrier member 13 supporting the triple pinion gears 14 and the second pinion gears PR2 is shared, it is possible to attain downsizing of the power plant 1B and enhancement of the mountability thereof.

Note that in the fourth to sixth embodiments, the vehicle is constructed such that the left and right front wheels are driven by the engine, and the left and right rear wheels WRL and WRR (left and right output shafts SRL and SRR) are driven by the power plant 1, 1A, or 1B, but inversely, the vehicle may be constructed such that the left and right output shafts connected to the respective left and right front wheels are driven by the power plant, and the left and right rear wheels WRL and WRR are driven by the engine. Further, although the fourth to sixth embodiments are examples in which the power plants 1, 1A, and 1B according to the present invention are applied to the vehicle having the engine installed thereon, the present invention is not limited to this, but it can be applied to a vehicle with no engine installed thereon.

Figure 17:
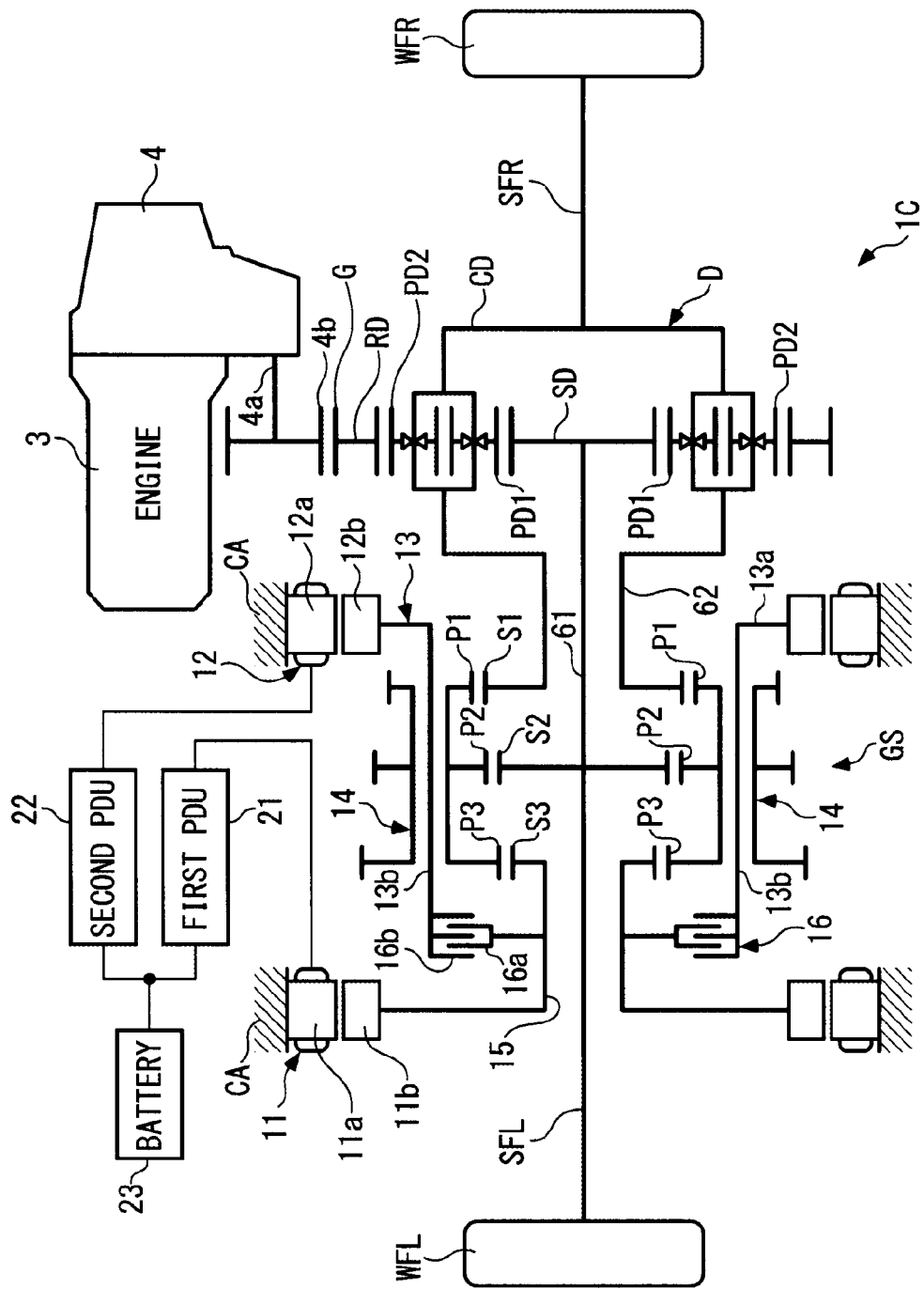
FIG. 17 A diagram schematically showing a power plant according to a seventh embodiment of the present invention together with left and right front wheels of a vehicle to which the power plant is applied.

Next, a power plant 1C according to a seventh embodiment of the present invention will be described with reference to FIG. 17. Differently from the fourth embodiment, this power plant 1C drives not the left and right output shafts SRL and SRR connected to the respective left and right rear wheels WRL and WRR but the left and right output shafts SFL and SFR connected to the respective left and right front wheels WFL and WFR, and is distinguished from the fourth embodiment mainly in that the power plant 1C further includes the engine 3 as a motive power source, the transmission 4, and the differential gear D, described in the first embodiment, in addition to the above-described gear unit GS and so forth. In FIG. 17, the same component elements as those of the first and fourth embodiments are denoted by the same reference numerals. The following description is mainly given of different points from the fourth embodiment.

The engine 3 is a gasoline engine, and is installed in a front part of a four-wheel vehicle. The transmission 4 is connected to a crankshaft (not shown) of the engine 3. The transmission 4 is a stepped automatic transmission, and has operation thereof controlled by the above-described ECU 2, to thereby transmit the motive power of the engine 3 to the output shaft 4a in a state changed in speed.

The differential gear D, the second rotating electric machine 12, the gear unit GS, and the first rotating electric machine 11 are arranged coaxially with the left and right output shafts SFL and SFR, between the left and right front wheels WFL and WFR, from the right side in the mentioned order.

Further, similarly to the first embodiment, the ring gear RD of the differential gear D is connected to the engine 3 via the transmission 4. The sun gear SD of the differential gear D is connected to the second sun gear S2 of the gear unit GS via a rotating shaft 61 rotatably supported by a bearing (not shown). The second sun gear S2 is integrally attached to the left output shaft SFL.

Further, the carrier CD of the differential gear D has a right end thereof integrally attached to the right output shaft SFR, and a left end thereof integrally attached to a right end of a hollow cylindrical rotating shaft 62. The first sun gear S1 is integrally attached to a left end of the rotating shaft 62. Further, the rotating shaft 62 is rotatably supported by a bearing (not shown), and the above-mentioned rotating shaft 61 is relatively rotatably disposed inside the rotating shaft 62. As described above, the carrier CD is provided in a power transmission path between the first sun gear S1 and the right output shaft SFR.

In the differential gear D constructed as above, similarly to the first embodiment, when torque of the engine 3 is transmitted to the ring gear RD via the transmission 4, the torque transmitted to the ring gear RD is distributed to the sun gear SD and the carrier CD at a torque distribution ratio of 1:1. The torque distributed to the sun gear SD is transmitted to the left front wheel WFL via the left output shaft SFL, and the torque distributed to the carrier CD is transmitted to the right front wheel WFR via the right output shaft SFR.

As described above, in the power plant 1C, the second sun gear S2 and the sun gear SD are connected to each other via the rotating shaft 61, and the second sun gear S2 is directly connected to the left output shaft SFL. Therefore, the rotational speeds of the second sun gear S2, the sun gear SD, and the left output shaft SFL are equal to each other. Further, the first sun gear S1 and the carrier CD are connected to each other via the rotating shaft 62, and the carrier CD is directly connected to the right output shaft SFR. Therefore, the rotational speeds of the first sun gear S1, the carrier CD, and the right output shaft SFR are equal to each other.

Furthermore, the relationship between the rotational speeds of the third to first sun gears S3 to S1 of the gear unit GS, the carrier member 13, and the first and second rotors 11b and 12b is the same as in the fourth embodiment. Further, as is apparent from the fact that the differential gear D is a planetary gear unit of a double pinion type, the sun gear SD, the ring gear RD, and the carrier CD can be differentially rotated with each other, and they are in a collinear relationship in which the rotational speeds thereof are located on the same straight line in a collinear chart and are arranged in the mentioned order therein.

Figure 18:
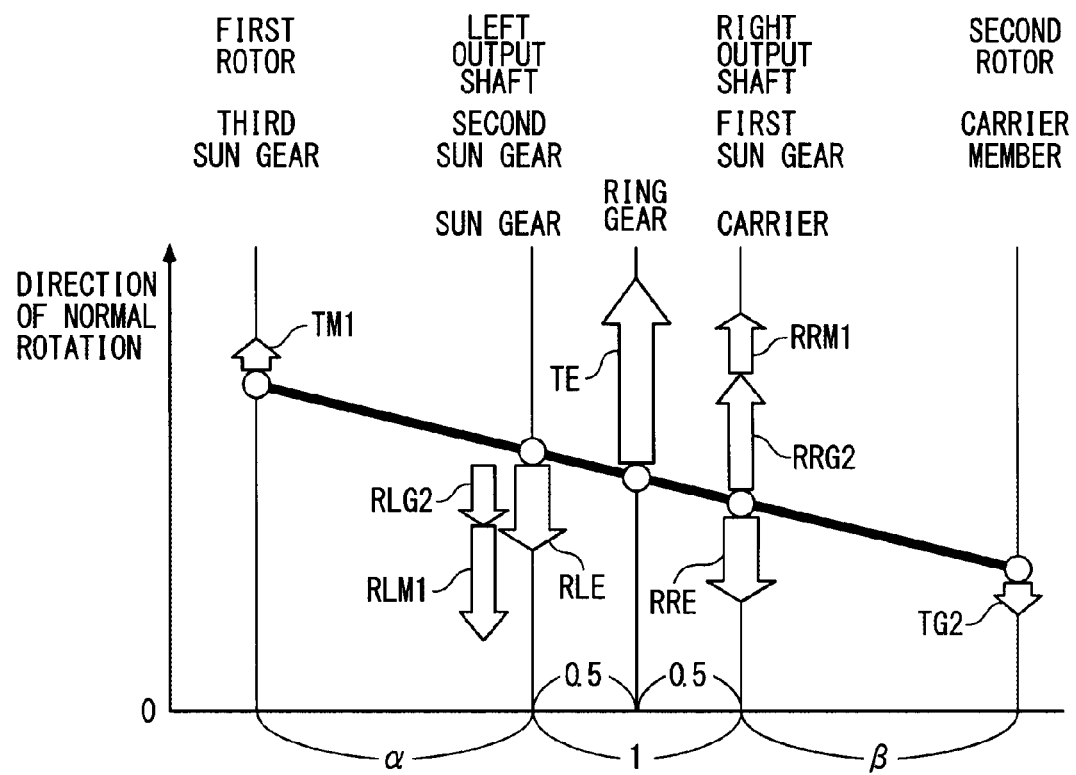
FIG. 18 A collinear chart showing a rotational speed relationship and a torque balance relationship between various types of rotary elements of the power plant shown in FIG. 17, during increasing control of the third yaw moment for right turning.

From the above, the relationship between the rotational speeds of various rotary elements of the power plant 1C are represented e.g. in a collinear chart shown in FIG. 18. As shown in the figure, five rotary elements the rotational speeds of which are in a collinear relationship with each other are formed by the sun gear SD, the ring gear RD, and the carrier CD of the differential gear D, the third to first sun gears S3 to S1 of the gear unit GS, and the carrier member 13. Further, as is apparent from FIG. 18, the left and right output shafts SFL and SFR can be differentially rotated with each other.

Furthermore, FIG. 18 shows a rotational speed relationship and a torque balance relationship between the various types of rotary elements in the third yaw moment-increasing control for right turning. In the figure, TE represents torque transmitted from the engine 3 to the ring gear RD via the transmission 4, and RLE and RRE represent reaction force torques which act on the left output shaft SFL and the right output shaft SFR along with transmission of torque from the engine 3 to the ring gear RD, respectively. The other parameters (the first motor output torque TM1, etc.) are the same as in the fourth embodiment. As is apparent from the fact that the torque transmitted to the ring gear RD is distributed to the sun gear SD and the carrier CD at the torque distribution ratio of 1:1 as mentioned hereinabove, the reaction force torques RLE and RRE are equal to each other.

In this case, torque transmitted to the left output shaft SFL is represented by RLE+RLM1+RLG2, and torque transmitted to the right output shaft SFR is represented by RRE−(RRM1+RRG2). As described above, the torque transmitted to the left output shaft SFL (left front wheel WFL) becomes larger than the torque transmitted to the right output shaft SFR (right front wheel WFR), whereby the right-turning yaw moment of the vehicle is increased.

As is apparent from a comparison between this FIG. 18, and FIG. 13 which shows the torque balance relationship etc. in the third yaw moment-increasing control for right turning, described in the fourth embodiment, an operation in the third yaw moment-increasing control is distinguished from the fourth embodiment only in that the engine torque having the speed thereof changed by the transmission 4 is distributed to the left and right output shafts SFL and SFR by the differential gear D. The same applies to various operations performed during straight forward traveling and in the first yaw moment-increasing control, and hence description of the operation by the power unit 1C is omitted.

Further, the correspondence between various elements of the seventh embodiment and various elements of the invention is as follows: The left and right output shafts SFL and SFR in the seventh embodiment correspond to one and the other of the two rotating shafts in the present invention, respectively, and the sun gear SD, the carrier CD, and the ring gear RD in the seventh embodiment correspond to first to third rotating bodies or fifth to seventh elements of the differential gear in the present invention. The engine 3 in the seventh embodiment corresponds to the torque generator in the present invention. The other correspondence is the same as in the fourth embodiment.

As described above, according to the seventh embodiment, the sun gear SD of the differential gear D is connected to the second sun gear S2, the carrier CD is provided in a power transmission path between the first sun gear S1 and the right output shaft SFR, and the ring gear RD is connected to the engine 3. From the above, not only the first and second motor output torques TM1 and TM2 but also the engine torque is transmitted to the left and right output shafts SFL and SFR, and hence it is possible to reduce torque required of the first and second rotating electric machines 11 and 12, and thereby make it possible to downsize the two 11 and 12. In addition to this, it is possible to obtain the same advantageous effects, such as suppression of loss, and enhancement of the stability of the behavior of the vehicle, as provided by the fourth embodiment.

Figure 19:
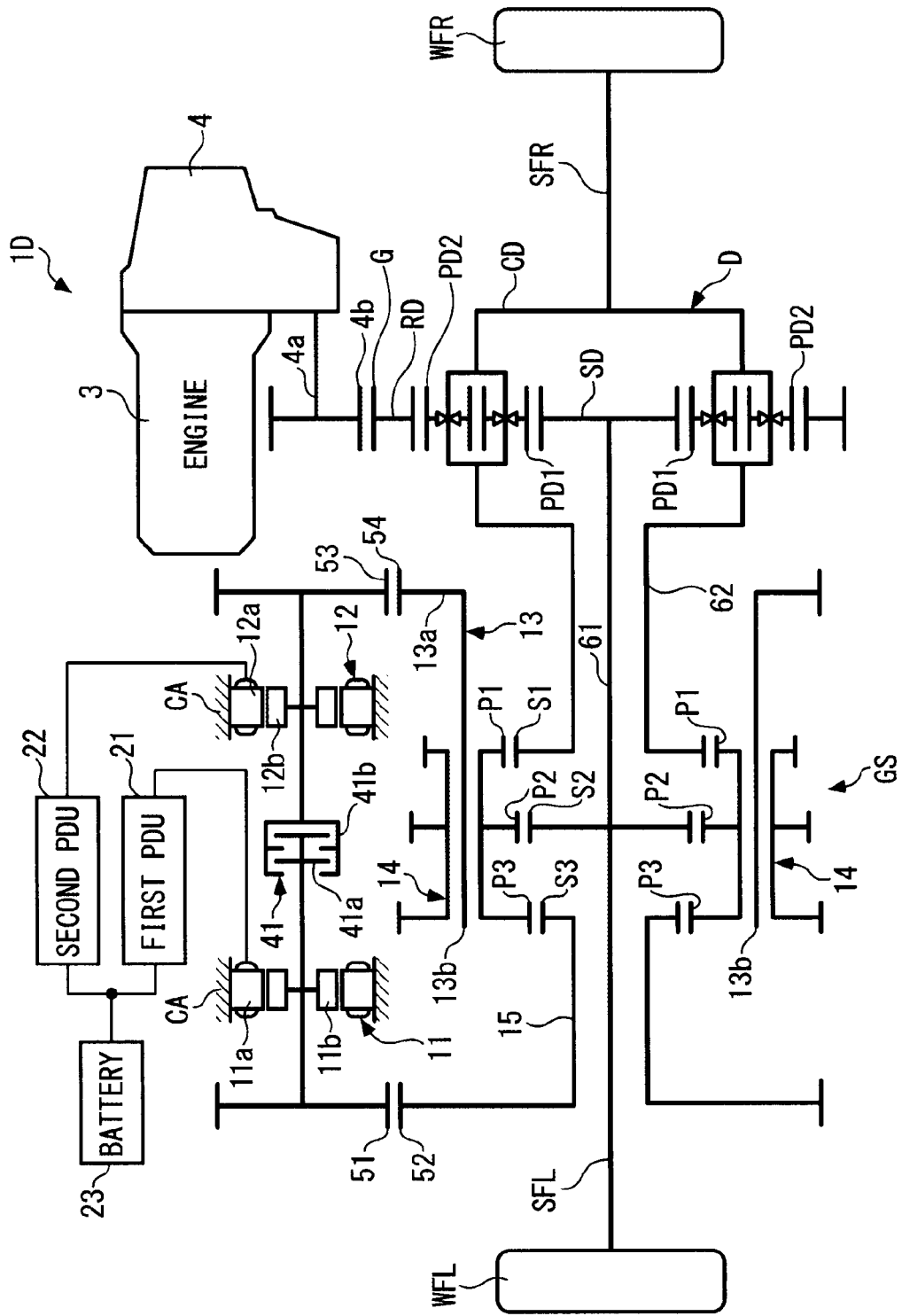
FIG. 19 A diagram schematically showing a power plant according to an eighth embodiment of the present invention together with left and right front wheels of a vehicle to which the power plant is applied.

Next, a power plant 1D according to an eighth embodiment of the present invention will be described with reference to FIG. 19. This power plant 1D is distinguished from the seventh embodiment shown in FIG. 17 only in that the reduction gears described in the fifth embodiment are provided in the power transmission path between the first rotor 11b and the differential limiting mechanism 41, and the third sun gear S3, and the power transmission path between the second rotor 12b and the differential limiting mechanism 41, and the carrier member 13, respectively. In FIG. 19, the same component elements as those of the fifth and seventh embodiments are denoted by the same reference numerals.

With the above arrangement, according to the eighth embodiment, similarly to the fifth embodiment, the reaction force torques from the differential limiting mechanism 41, the first and second motor output torques TM1 and TM2, and the first and second motor braking torques TG1 and TG2 can be transmitted to the third sun gear S3 and the carrier member 13, in increased states, via the above-mentioned reduction gears, i.e. the gears 51 to 54. Therefore, it is possible to downsize the differential limiting mechanism 41, and the first and second rotating electric machines 11 and 12, and in turn to attain downsizing of the power plant 1D and enhancement of the mountability thereof. In addition to this, it is possible to obtain the same advantageous effects as provided by the seventh embodiment.

Note that the correspondence between various elements of the eighth embodiment and various elements of the invention is the same as the correspondence between the second and seventh embodiments and the invention.

Figure 20:
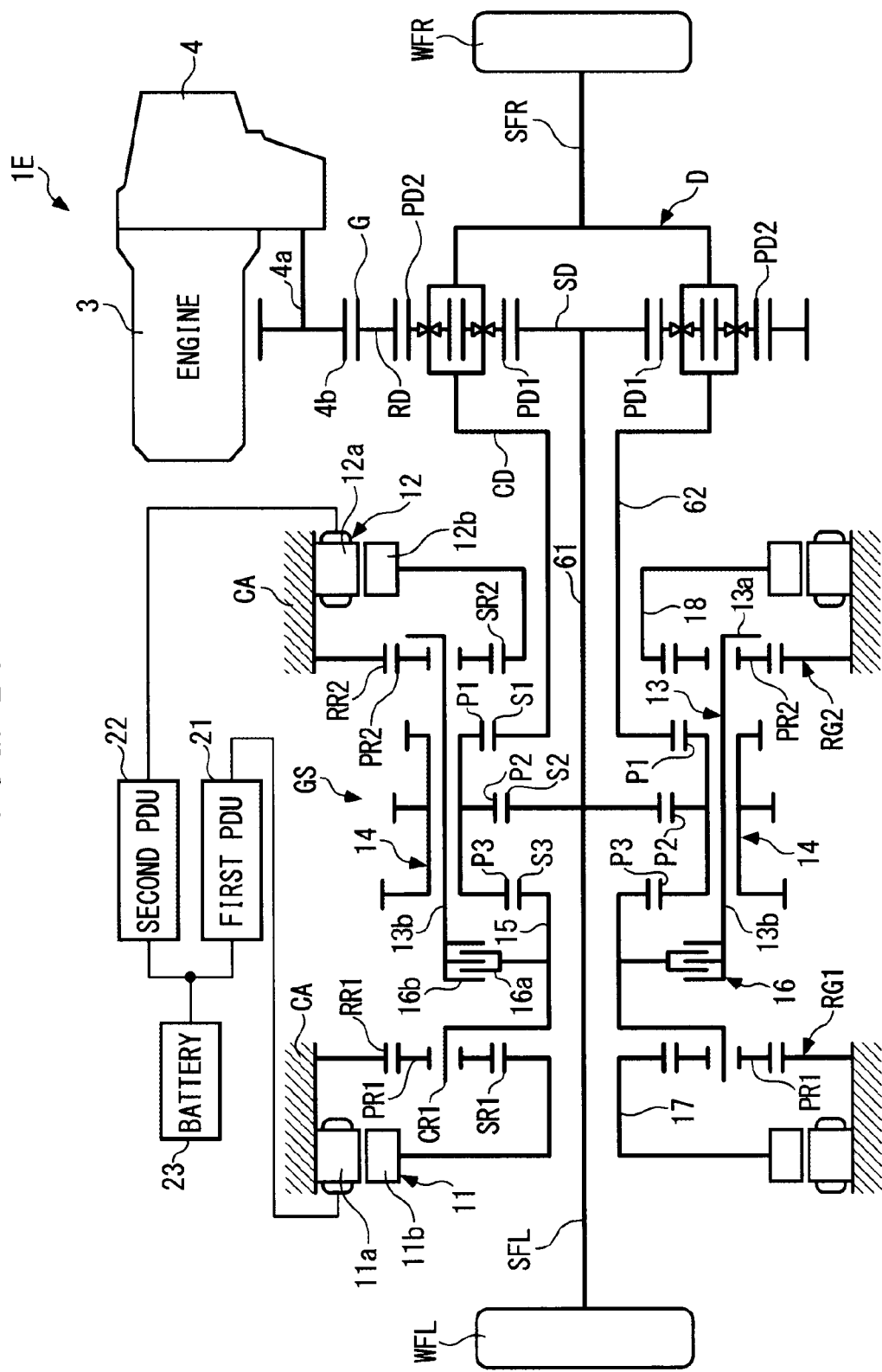
FIG. 20 A diagram schematically showing a power plant according to a ninth embodiment of the present invention together with left and right front wheels of a vehicle to which the power plant is applied.

Next, a power plant 1E according to a ninth embodiment of the present invention will be described with reference to FIG. 20. This power plant 1E is distinguished from the seventh embodiment shown in FIG. 17 only in that the first reduction gear RG1 and the second reduction gear RG2 described in the sixth embodiment are provided in the power transmission path between the first rotor 11b and the third sun gear S3, and the power transmission path between the second rotor 12b and the carrier member 13, respectively. In FIG. 20, the same component elements as those of the sixth and seventh embodiments are denoted by the same reference numerals.

With the above arrangement, according to the ninth embodiment, similarly to the sixth embodiment, the first and second motor output torques TM1 and TM2, and the first and second motor braking torques TG1 and TG2 can be transmitted to the third sun gear S3 and the carrier member 13, in increased states, via the first and second reduction gears RG1 and RG2, respectively, whereby it is possible to downsize the first and second rotating electric machines 11 and 12. In addition to this, it is possible to obtain the same advantageous effects as provided by the seventh embodiment.

Figure 21:
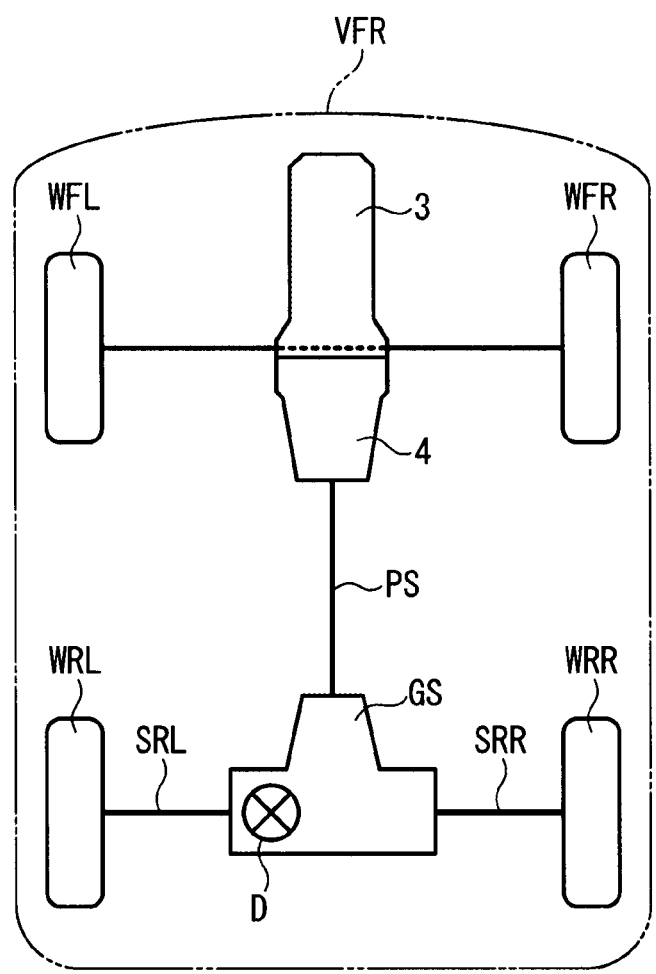
FIG. 21 A diagram schematically showing an FR type vehicle to which a power plant according to a first variation of the seventh to ninth embodiments of the present invention is applied.

FIG. 21 shows a first variation of the above-described seventh to ninth embodiments. This first variation is an example in which the power plant is applied to the vehicle VFR of an FR (front-engine rear-drive) type. In this vehicle VFR, the differential gear D, the gear unit GS, the differential limiting mechanism, and the first and second rotating electric machines 11 and 12 (none of which are shown) are arranged in a rear part of the vehicle VFR, and the above-described ring gear (not shown) of the differential gear D is connected to the transmission 4 via the propeller shaft PS. Further, the relationship of connections between the left and right output shafts SRL and SRR, the differential gear D, the gear unit GS, the differential limiting mechanism, and the first and second rotating electric machines is distinguished from the seventh to ninth embodiments only in that the left and right output shafts SFL and SFR on the front side are replaced by the left and right output shafts SRL and SRR on the rear side, and the other of the relationship is the same as in the seventh to ninth embodiments.

With the above arrangement, the engine torque is transmitted to the left and right output shafts SRL and SRR via the transmission 4, propeller shaft PS, and the differential gear D, and is further transmitted to the left and right rear wheels WRL and WRR. Further, the first and second motor output torques and the first and second motor braking torques are transmitted to the left and right output shafts SRL and SRR via the gear unit GS and the differential gear D, and is further transmitted to the left and right rear wheels WRL and WRR. Furthermore, the differential rotation between the left and right output shafts SRL and SRR is limited by connection between the third sun gear and the carrier member by the differential limiting mechanism (none of which are shown).

Therefore, in the first variation as well, it is possible to obtain the same advantageous effects as provided by the seventh to ninth embodiments.

Figure 22:
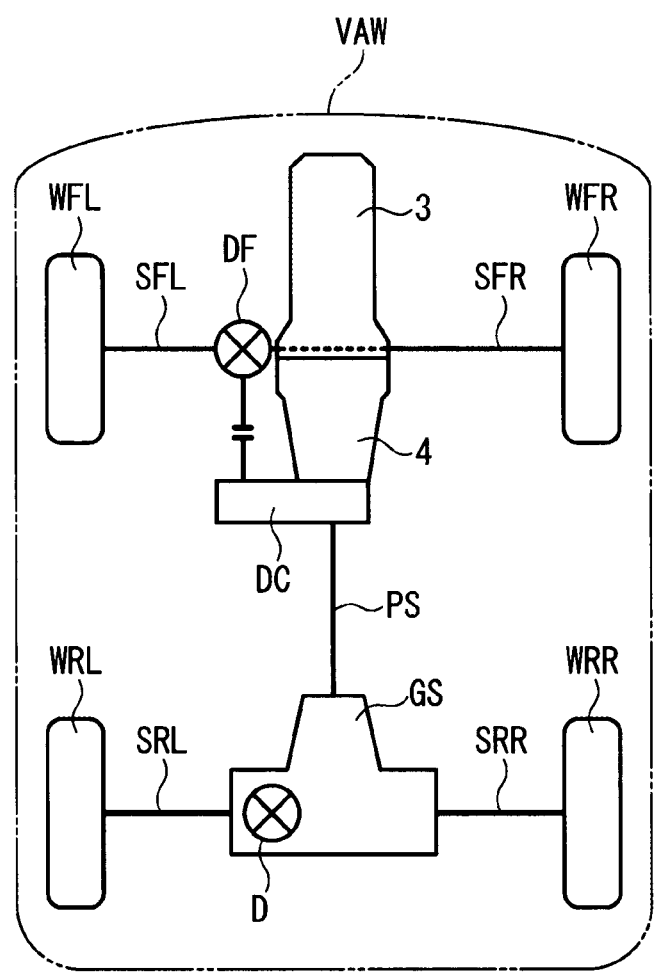
FIG. 22 A diagram schematically showing an all-wheel drive vehicle to which a power plant according to a second variation of the seventh to ninth embodiments of the present invention is applied.

Further, FIG. 22 shows a second variation of the seventh to ninth embodiments. This second variation is an example in which the power plant is applied to the all-wheel drive vehicle VAW. In this vehicle VAW, the front-side left and right output shafts SFL and SFR are connected to the engine 3 via the front differential DF, the center differential DC, and the transmission 4. Further, the differential gear D, the gear unit GS, the differential limiting mechanism, and the first and second rotating electric machines (none of which are shown) are arranged in a rear part of the vehicle VAW, and the ring gear (not shown) of the differential gear D is connected to the transmission 4 via the propeller shaft PS and the center differential DC. Further, the relationship of connections between the left and right output shafts SRL and SRR, the differential gear D, the gear unit GS, and the first and second rotating electric machines is the same as in the above-described first variation.

With the above arrangement, the engine torque is transmitted to the center differential DC via the transmission 4, and is distributed to the front differential DF and the propeller shaft PS. The torque distributed to the front differential DF is transmitted to the left and right output shafts SFL and SFR, and is further transmitted to the left and right front wheels WFL and WFR. The torque distributed to the propeller shaft PS is transmitted to the left and right output shafts SRL and SRR via the differential gear D, and is further transmitted to the left and right rear wheels WRL and WRR. Further, the first and second motor output torques, and the first and second motor braking torques are transmitted to the left and right output shafts SRL and SRR via the gear unit GS and the differential gear D, and is further transmitted to the left and right rear wheels WRL and WRR. Furthermore, the differential rotation between the left and right output shafts SRL and SRR is limited by connection between the third sun gear and the carrier member by the differential limiting mechanism (none of which are shown). Therefore, in the second variation as well, it is possible to obtain the same advantageous effects as provided by the seventh to ninth embodiments.

Note that the vehicles VFR and VAW of the first and second variations of the seventh to ninth embodiments correspond to a moving apparatus according to the present invention. Further, although in the first and second variations, the engine 3 and the transmission 4 are arranged in the front parts of the vehicles VFP and VAW, they may be arranged in the rear parts of the vehicles.

Note that the present invention is by no means limited to the fourth to ninth embodiments (including the variations) described above, but can be practiced in various forms. For example, although in the above-described fourth to ninth embodiments, the first sun gear S1 is connected to the right output shaft SRR (SFR), and the second sun gear S2 is connected to the left output shaft SRL (SFL), this is not limitative, but inversely, the first sun gear S1 may be connected to the left output shaft SRL (SFL), and the second sun gear S2 may be connected to the right output shaft SRR (SFR). In this case, the carrier CD of the differential gear D, described in the seventh to ninth embodiments, is provided in the power transmission path between the first sun gear S1 and the left output shaft SRL (SFL).

Furthermore, although in the fourth to ninth embodiments, the third to first sun gears S3 to S1, and the carrier member 13 are used as the first to fourth elements in the present invention, other four rotary elements the rotational speeds of which are in a collinear relationship with each other may be used as the first to fourth elements. For example, desired two rotary elements of a sun gear, a carrier, and a ring gear of a planetary gear unit, and desired two rotary elements of a sun gear, a carrier, and a ring gear of a planetary gear unit other than the above may be connected to each other, and four rotary elements formed by the connection may be used. In this case, the planetary gear units may be of a single pinion type or of a double pinion type. Alternatively, four rotary elements of a so-called Ravigneaux type planetary gear unit (planetary gear units of the single pinion type and the double pinion type in which a carrier and a ring gear are shared for use) may be used.

Alternatively, there may be used four rotary elements constructed as follows: A double pinion gear formed by mutually-integrated first and second pinion gears is rotatably supported by a rotatable carrier member; three rotary elements are selected from four rotary elements consisting of a first sun gear and a first ring gear which are rotatable and are in mesh with the first pinion gear, and a second sun gear and a second ring gear which are rotatable and are in mesh with the second pinion gear; and the four rotary elements is formed by adding the above-mentioned carrier member to the three rotary elements. In this case, an unselected one of the rotary elements can be omitted. Further, the first sun gear or the first ring gear may be brought into mesh with the first pinion gear via another pinion gear without being brought into direct mesh with the first pinion gear. The same applies to the second sun gear and the second ring gear.

Further, although in the fourth to ninth embodiments, the first and second torque generators are the first and second rotating electric machines 11 and 12, they may be replaced by other suitable devices, such as hydraulic motors, which can generate positive torque and negative torque. Further, although in the fourth to ninth embodiments, the differential limiting mechanisms 16 and 41 are formed by hydraulic clutches, they may be formed by other suitable mechanisms, such as electromagnetic clutches, which have a function of connecting and disconnecting between the third sun gear S3 (first element) and the carrier member 13 (fourth element).

Furthermore, although in the fourth to ninth embodiments, the gears 51 and 52 and the gears 53 and 54 are used as the first power transmission mechanism and the second power transmission mechanism in the present invention, respectively, there may be used other suitable mechanisms, such as a power transmission mechanism formed by a pair of pulleys and a belt extending around the pulleys, and a power transmission mechanism formed by a pair of sprockets and a chain extending around the sprockets, which can transmit reaction forces from the differential limiting mechanisms in increased states. Further, although in the fourth to ninth embodiments, the differential gear D, which is a planetary gear unit of a double pinion type, is used, a suitable differential gear of any other type may be used which has the first to third rotating bodies (fifth to seventh elements) which are differentially rotatable with respect to each other. For example, there may be used a planetary gear unit of a single pinion type or a differential gear of the following type: A type which has a pair of side gears, a plurality of pinion gears in mesh with the side gears, and a carrier rotatably supporting the pinion gears, and distributes torque transmitted to the carrier of the pair of side gears at a distribution ratio of 1:1.

Further, although in the fourth to ninth embodiments, the engine (3), which is a gasoline engine, is used as an energy output device in the present invention, any other suitable device, such as a diesel engine, an LPG engine, a CNG (Compressed Natural Gas) engine, an external combustion engine, a rotating electric machine, or a hydraulic motor, may be used which can generate positive torque. Further, although in the fourth to ninth embodiments, the power plants 1, 1A to 1E according to the present invention are configured to drive the left and right output shafts SRL and SRR (SFL and SFR), they may be configured to drive front and rear output shafts connected to front and rear drive wheels of the vehicle.

Further, although in the first to ninth embodiments (including the variations), the first to third pinion gears P1 to P3 are integrally formed with each other, they may be formed separately and then be integrally connected to each other.

Further, although in the first to third embodiments, electric power generated and recovered by the first and second motors 113 and 114 is charged (accumulated) in the battery 23, the electric power may be accumulated in any other electric energy accumulator, such as a capacitor (electric power storage device). Alternatively, any other motor than the first and second motors 113 and 114, and a flywheel (kinetic energy storage device) connected to the other motor may be used to convert the electric power generated and recovered by the first and second motors 113 and 114 to motive power using the other motor, and accumulate the motive power obtained by the conversion in the flywheel as kinetic energy. Furthermore, the electric power generated and recovered by the first and second motors 113 and 114 may be directly supplied to a power consuming device (the other motor, etc.) without providing the electric or motive power energy storage device described above. Alternatively, a hydraulic pump capable of converting rotational energy to pressure energy may be used in place of the first and second motors 113 and 114, and the pressure energy obtained by the conversion by the hydraulic pump may be accumulated in the accumulator. The same applies to the fourth to ninth embodiments.

Further, although in the first to third embodiments, the first and second motors 113 and 114, which are AC motors, are used as the rotating electric machines in the present invention, any other suitable device, such as a DC motor, may be used which can perform energy conversion between rotational energy and electric energy. Furthermore, although in the first to third embodiments, the battery 23 is shared by the first and second motors 113 and 114, the battery may be provided separately. The same applies to the fourth to ninth embodiments.

Further, although the first to ninth embodiments are examples in which the present invention is applied to a vehicle, the present invention is not limited to this, but it may be applied e.g. to boats or aircrafts. It is to be further understood that various changes and modifications may be made without departing from the spirit and scope thereof.

INDUSTRIAL APPLICABILITY

The present invention is capable of suppressing loss, and is very useful for attaining downsizing of the power transmission system and enhancement of the mountability thereof.

REFERENCE SIGNS LIST

T power transmission system (power plant)
SFL left output shaft (one of two rotating shafts)
SFR right output shaft (the other of two rotating shafts)
111 carrier member
P1 first pinion gear
P2 second pinion gear
P3 third pinion gear
112 triple pinion gear
113 first motor (first torque generator, rotating electric machine)

114 second motor (second torque generator, rotating electric machine)
VFR vehicle (moving apparatus)
VAW vehicle (moving apparatus)
SRL left output shaft (one of two rotating shafts)
SRR right output shaft (the other of two rotating shafts)
1 power plant
1A power plant
1B power plant
1C power plant
1D power plant
1E power plant
3 engine (torque generator)
11 first rotating electric machine (first torque generator)
12 second rotating electric machine (second torque generator)
GS gear unit
13 carrier member (fourth element)
14 triple pinion gear
S1 first sun gear (third element)
S2 second sun gear (second element)
S3 third sun gear (first element)
16 differential limiting mechanism
41 differential limiting mechanism
51 gear (first power transmission mechanism)
52 gear (first power transmission mechanism)
53 gear (second power transmission mechanism)
54 gear (second power transmission mechanism)
D differential gear
SD sun gear (first rotating body, fifth element)
CD carrier (second rotating body, sixth element)
RD ring gear (third rotating body, seventh element)
TM1 first motor torque (positive torque)
TG1 first motor braking torque (negative torque)
TM2 second motor torque (positive torque)
TG2 second motor braking torque (negative torque)

The invention claimed is:

1. A power plant that drives two rotating shafts configured to be differentially rotatable with each other in order to move a moving apparatus, comprising:
   a carrier member that is rotatable;
   a triple pinion gear that is formed by a first pinion gear, a second pinion gear, and a third pinion gear, which are integrally formed with each other, and is rotatably supported by said carrier member;
   a first sun gear that is rotatable and is in mesh with said first pinion gear;
   a second sun gear that is rotatable and is in mesh with said second pinion gear;
   a third sun gear that is rotatable and is in mesh with said third pinion gear,
   wherein said triple pinion gear and said first to third sun gears are configured such that when said triple pinion gear is rotating in a state in which said carrier member is fixed, a rotational speed of said second sun gear becomes higher than a rotational speed of said first sun gear, and a rotational speed of said third sun gear becomes higher than the rotational speed of said second sun gear,
   the power plant further comprising:
   a first torque generator that is capable of generating positive torque and negative torque; and
   a second torque generator that is capable of generating positive torque and negative torque,
   wherein said third sun gear is connected to said first torque generator, said second sun gear is connected to one of the two rotating shafts, said first sun gear is connected to the other of the two rotating shafts, and said carrier member is connected to said second torque generator,
   wherein the power plant further comprises:
   a differential limiting mechanism that is connected to said third sun gear and said carrier member, for limiting differential rotation between the two rotating shafts by connecting and disconnecting between said third sun gear and said carrier member.

2. The power plant according to claim 1, further comprising:
   a differential gear that includes a first rotating body, a second rotating body, and a third rotating body, which are differentially rotatable with each other; and
   a torque generator that is capable of generating positive torque, and is provided separately from said first and second torque generators, and
   wherein said first rotating body is connected to said second sun gear, said second rotating body is provided in a power transmission path between said first sun gear and the other of the two rotating shafts, and said third rotating body is connected to said torque generator.

3. The power plant according to claim 1, wherein said first and second torque generators are rotating electric machines.

4. The power plant according to claim 1, further comprising:
   a first power transmission mechanism that is provided in a power transmission path between said third sun gear and said differential limiting mechanism, for transmitting reaction force torque of said differential limiting mechanism, generated by connection between said third sun gear and said carrier member by said differential limiting mechanism, to said third sun gear, in an increased state; and
   a second power transmission mechanism that is provided in a power transmission path between said carrier member and said differential limiting mechanism, for transmitting reaction force torque of said differential limiting mechanism, generated by connection between said third sun gear and said carrier member by said differential limiting mechanism, to said carrier member, in an increased state.

5. The power plant according to claim 4, further comprising:
   a differential gear that includes a first rotating body, a second rotating body, and a third rotating body, which are differentially rotatable with each other; and
   a torque generator that is capable of generating positive torque, and is provided separately from said first and second torque generators, and
   wherein said first rotating body is connected to said second sun gear, said second rotating body is provided in a power transmission path between said first sun gear and the other of the two rotating shafts, and said third rotating body is connected to said torque generator.

6. The power plant according to claim 4, wherein said first and second torque generators are rotating electric machines.

7. A power plant that drives two rotating shafts configured to be differentially rotatable with each other in order to move a moving apparatus, comprising:
   a carrier member that is rotatable;
   a triple pinion gear that is formed by a first pinion gear, a second pinion gear, and a third pinion gear, which are integrally formed with each other, and is rotatably supported by said carrier member;
   a first sun gear that is rotatable and is in mesh with said first pinion gear;

a second sun gear that is rotatable and is in mesh with said second pinion gear;
a third sun gear that is rotatable and is in mesh with said third pinion gear,
wherein said triple pinion gear and said first to third sun gears are configured such that when said triple pinion gear is rotating in a state in which said carrier member is fixed, a rotational speed of said second sun gear becomes higher than a rotational speed of said first sun gear, and a rotational speed of said third sun gear becomes higher than the rotational speed of said second sun gear,
the power plant further comprising:
a first torque generator that is capable of generating positive torque and negative torque; and
a second torque generator that is capable of generating positive torque and negative torque,
wherein said third sun gear is connected to said first torque generator, said second sun gear is connected to one of the two rotating shafts, said first sun gear is connected to the other of the two rotating shafts, and said carrier member is connected to said second torque generator,
wherein the power plant further comprises:
a differential gear that includes a first rotating body, a second rotating body, and a third rotating body, which are differentially rotatable with each other; and
a torque generator that is capable of generating positive torque, and is provided separately from said first and second torque generators, and
wherein said first rotating body is connected to said second sun gear, said second rotating body is provided in a power transmission path between said first sun gear and the other of the two rotating shafts, and said third rotating body is connected to said torque generator.

8. The power plant according to claim 7, wherein said first and second torque generators are rotating electric machines.

9. A power plant that drives two rotating shafts configured to be differentially rotatable with each other in order to move a moving apparatus, comprising:
a gear unit that includes a first element, a second element, a third element, and a fourth element, between which motive power can be transmitted, and is configured such that rotational speeds of said first to fourth elements are in a predetermined collinear relationship in which the rotational speeds are located on the same straight line in a collinear chart, and when said second to fourth elements are caused to rotate in a state of said first element being fixed, said second to fourth elements rotate in the same direction, and the rotational speed of said fourth element becomes higher than the rotational speeds of said second and third elements;
a first torque generator that is capable of generating positive torque and negative torque; and
a second torque generator that is capable of generating positive torque and negative torque,
wherein said first element is connected to said first torque generator, said second element is connected to one of the two rotating shafts, said third element is connected to the other of the two rotating shafts, and said fourth element is connected to said second torque generator,
the power plant further comprising a differential limiting mechanism that is connected to said first and fourth elements, for limiting differential rotation between the two rotating shafts by connecting and disconnecting between said first element and said fourth element.

10. The power plant according to claim 9, wherein said first and second torque generators are rotating electric machines.

11. The power plant according to claim 9, further comprising:
a differential gear that includes a fifth element, a sixth element, and a seventh element, which are differentially rotatable with each other; and
a torque generator that is capable of generating positive torque, and is provided separately from said first and second torque generators, and
wherein said fifth element is connected to said second element, said sixth element is provided in a power transmission path between said third element and the other of the two rotating shafts, and said seventh element is connected to said torque generator.

12. The power plant according to claim 11, wherein said first and second torque generators are rotating electric machines.

13. The power plant according to claim 9, further comprising:
a first power transmission mechanism that is provided in a power transmission path between said first element and said differential limiting mechanism, for transmitting reaction force torque of said differential limiting mechanism, generated by connection between said first element and said fourth element by said differential limiting mechanism, to said first element, in an increased state; and
a second power transmission mechanism that is provided in a power transmission path between said fourth element and said differential limiting mechanism, for transmitting reaction force torque of said differential limiting mechanism, generated by connection between said first element and said fourth element by said differential limiting mechanism, to said fourth element, in an increased state.

14. The power plant according to claim 13, further comprising:
a differential gear that includes a fifth element, a sixth element, and a seventh element, which are differentially rotatable with each other; and
a torque generator that is capable of generating positive torque, and is provided separately from said first and second torque generators, and
wherein said fifth element is connected to said second element, said sixth element is provided in a power transmission path between said third element and the other of the two rotating shafts, and said seventh element is connected to said torque generator.

15. The power plant according to claim 13, wherein said first and second torque generators are rotating electric machines.

* * * * *